(12) United States Patent
Baumann

(10) Patent No.: US 10,767,759 B2
(45) Date of Patent: *Sep. 8, 2020

(54) SYSTEM AND METHOD FOR CALIBRATING A TRANSMISSION

(71) Applicant: Baumann Electronic Controls, LLC, Pickens, SC (US)

(72) Inventor: Karl William Baumann, Pickens, SC (US)

(73) Assignee: Baumann Electronic Controls, LLC, Pickens, SC (US)

(*) Notice: Subject to any disclaimer, the term of this patent is extended or adjusted under 35 U.S.C. 154(b) by 62 days.

This patent is subject to a terminal disclaimer.

(21) Appl. No.: 16/140,717

(22) Filed: Sep. 25, 2018

(65) Prior Publication Data
US 2019/0024783 A1   Jan. 24, 2019

Related U.S. Application Data

(63) Continuation of application No. 15/275,649, filed on Sep. 26, 2016, now Pat. No. 10,100,922.

(51) Int. Cl.
| | |
|---|---|
| *F16H 61/02* | (2006.01) |
| *B60K 23/00* | (2006.01) |
| *F16H 59/36* | (2006.01) |
| *F16H 61/00* | (2006.01) |
| *F16H 59/44* | (2006.01) |
| *B60K 17/02* | (2006.01) |
| *B60K 17/08* | (2006.01) |

(Continued)

(52) U.S. Cl.
CPC ......... *F16H 61/0204* (2013.01); *B60K 17/02* (2013.01); *B60K 17/08* (2013.01); *B60K 23/00* (2013.01); *B60K 23/02* (2013.01); *F16H 59/36* (2013.01); *F16H 59/44* (2013.01); *F16H 61/0021* (2013.01); *F16D 2500/70217* (2013.01); *F16H 2059/446* (2013.01); *F16H 2061/0062* (2013.01); *F16H 2061/064* (2013.01); *F16H 2342/04* (2013.01)

(58) Field of Classification Search
CPC .... F16H 59/36; F16H 59/44; F16H 2059/446; F16H 61/0021; F16H 2061/064
See application file for complete search history.

(56) References Cited

U.S. PATENT DOCUMENTS

| | | |
|---|---|---|
| 4,615,425 A | 10/1986 | Kobayashi |
| 5,043,892 A | 8/1991 | Brekkestran |

(Continued)

OTHER PUBLICATIONS

Quick 4 Operation and Installation Manual; Bauman Electronic Controls, LLC, dated Mar. 2, 2016.

(Continued)

*Primary Examiner* — David R Morris
(74) *Attorney, Agent, or Firm* — JK Intellectual Property Law, PA

(57) ABSTRACT

A method of adjusting and using operating parameters of a transmission of a vehicle may include accessing a stored list of clutch parameters, performing a dynamic condition procedure while the vehicle is driven to revise minimum on-coming apply pressure for each friction element based on a sensed performance of an element within the vehicle powertrain, storing the modified minimum on-coming apply pressures, and operating the vehicle. A related transmission control device operates a transmission using parameters obtained during a dynamic condition procedure.

29 Claims, 13 Drawing Sheets

(51) Int. Cl.
*B60K 23/02* (2006.01)
*F16H 61/06* (2006.01)

(56) References Cited

U.S. PATENT DOCUMENTS

| | | | |
|---|---|---|---|
| 5,737,979 | A | 4/1998 | McKenzie et al. |
| 5,842,375 | A | 12/1998 | Reeves et al. |
| 6,341,552 | B1 | 1/2002 | Potter |
| 6,477,446 | B1 | 11/2002 | Holtmann |
| 6,640,950 | B2 | 11/2003 | Harvey et al. |
| 7,373,234 | B1 | 5/2008 | Hwang |
| 7,731,630 | B2 | 6/2010 | League et al. |
| 8,050,835 | B2 | 11/2011 | Wilson |
| 8,170,761 | B2 | 5/2012 | Kraenzlein et al. |
| 8,489,297 | B2 | 7/2013 | Kabrich |
| 9,002,598 | B2 | 4/2015 | Schmidt et al. |
| 9,115,772 | B2 | 8/2015 | Dix et al. |
| 9,181,995 | B1 | 11/2015 | Thornton et al. |
| 2003/0121748 | A1 | 7/2003 | Harvey |
| 2008/0194384 | A1 | 8/2008 | League |
| 2009/0272616 | A1 | 11/2009 | Wilson |
| 2013/0213760 | A1 | 8/2013 | Wilson |
| 2014/0032064 | A1 | 1/2014 | Thor |
| 2014/0129104 | A1 | 5/2014 | Park |
| 2014/0207350 | A1 | 7/2014 | Dix |

OTHER PUBLICATIONS

Quick 4 Diagnostic and Tuning Interface Manual; Bauman Electronic Controls, LLC, dated Mar. 2, 2016.

SYSTEM AND METHOD FOR CALIBRATING A TRANSMISSION

CROSS-REFERENCE TO RELATED APPLICATIONS

The present application is a continuation application of and claims priority to co-pending U.S. patent application Ser. No. 15/275,649, filed Sep. 26, 2016, which application is also incorporated by reference herein.

TECHNICAL FIELD

The present disclosure relates generally to calibrating clutch-to-clutch transmissions.

BACKGROUND

Clutch-to-clutch (C2C) automatic transmissions generally employ current-controlled clutch pressure control solenoids to perform mainly synchronous shifts. Typically, solenoid response characteristics (e.g., pressure vs. current performance curves) for most C2C transmissions are not calibrated to a specific performance standard during manufacture. Instead, the solenoid performance characteristics are measured after solenoid manufacture with the resultant solenoid performance curves being stored in the transmission or powertrain control module during assembly integration. This data is typically not available to aftermarket manufacturers or custom vehicle builders.

An issue with creating tuning calibrations for C2C transmissions is that production variances exist in aspects of the system components such as in the response curves of the pressure control solenoids. Production variances also exist in the size and/or characteristics of other transmission components such as valve bodies, clutch assemblies, and friction materials. In typical non-customized OEM vehicles, such variances are not problematic.

However, such variances can be problematic for customized vehicles, aftermarket modified vehicles, racing vehicles, etc., where modifications are made to accommodate higher power levels and unique application requirements. Such modifications may include the use of different clutch or band friction materials with different static and dynamic friction coefficients, different numbers of friction and separator plates, different clutch pack clearances, different piston sizes, valve body modifications, and various other changes which are likely to affect transmission shift quality, and the required clutch (or band servo) pressures during a shift. Extensive changes to engine torque and power curves also significantly influence transmission operation, and would render most of the assumptions and formulas used in creating the original manufacturer's calibration data invalid, even if this data were freely available to aftermarket manufacturers. For these reasons, an OEM-style standardized tuning methodology is generally less useful for performance applications where characterization information is rarely available, and where modifications are prevalent.

Calibrating a C2C transmission from scratch without any initial characterization data is beyond the capabilities of most automotive enthusiasts. This process is so complex that an extensive training program must be completed in order to effectively and safely use some of the current aftermarket systems. The inherent synchronous nature of C2C transmission shifting also introduces a potential hazard if the transmission is improperly tuned, since these transmissions have the potential to "tie up" (by attempting to operate in two ratios at the same time), which can cause the vehicle's drive wheels to lock, leading to a potential loss of vehicle control. To this end, a system and method are needed that can easily create a safe and effective transmission calibration in the absence of factory characterization and calibration data.

Accordingly, improvements would be welcome to transmissions in general, and to C2C transmissions, systems, and methods of calibrating transmissions that address one or more drawbacks of current technology and/or any other issues.

SUMMARY

According to certain aspects of the disclosure, a transmission control device is disclosed for a vehicle having a powertrain including an engine, a transmission with a plurality of solenoid actuated friction elements, and sensors, the device including at least one connection for transmitting signals to and from the engine, the transmission, and the sensors within the vehicle; and a memory for storing a program for adjusting and controlling the transmission and data including friction element apply pressure data. The device adjusts while the vehicle is not being driven a minimum on-going apply pressure for the friction elements until an initial optimized value is determined based on a sensed friction element performance. The device further adjusts while the vehicle is being driven on-going apply pressure for the friction elements until a further optimized value is determined based on a sensed performance of an element within the powertrain. The device controls the transmission using the further optimized value. Various options and modifications are possible.

For example, wherein the adjusting may include adjusting while the vehicle is not being driven a maximum off-going apply pressure for the friction elements until an initial optimized value is determined based on a sensed friction element performance. Also, the further adjusting may include further adjusting while the vehicle is being driven off-going apply pressure for the friction elements until a further optimized value is determined based on a sensed performance of an element within the powertrain. The sensed performance may be indicated by Ratio Slip RPM Acceleration.

The device may further include a housing in which the memory is mounted and to which the at least one connection is connected. The housing may include a display and at least one input element, and the device may further include a user input device separate from and in communication with the housing, the user input device having a display and at least one input element.

The further adjusting may be performed on the data without the adjusting. The data may include a plurality of lookup tables with transmission control data stored in the memory. The program may update the data within the lookup tables based on the adjusting and the further adjusting. The program may also interpolate data in the lookup tables based on the updated data to create further updated lookup tables.

At least one of the connections may connect to an electronic control module of the vehicle for providing operating instruction signals to the electronic control module. The program may direct the transmission to operate with a short-duration, high-pressure pulse for the on-coming clutch at the beginning of a shift.

The adjusting may be performed incrementally with each successive increment of minimum on-going apply pressure being about 10% higher than at a respective preceding increment. Each successive increment of minimum on-going apply pressure may be about 5% higher than at a respective preceding increment. Each successive increment of minimum on-going apply pressure may also be about 2% higher than at a respective preceding increment.

After the initial optimized value is determined the device again may adjust while the vehicle is not being driven the minimum on-going apply pressure for the friction elements until a revised initial optimized value is determined based on a sensed friction element performance, the again adjusting being performed incrementally with each successive increment of minimum on-going apply pressure being about 2% higher than at a respective preceding increment.

The adjusting may be performed incrementally with each successive increment of minimum on-going apply pressure being a first incremental value higher than at a respective preceding increment, and the device may again adjust while the vehicle is not being driven the minimum on-going apply pressure for the friction elements until a revised initial optimized value is determined based on a sensed friction element performance, the again adjusting being performed incrementally with each successive increment of minimum on-going apply pressure being a second incremental value smaller than the first incremental value and higher than at a respective preceding increment.

The further adjusting may be performed incrementally with each successive increment of minimum on-going apply pressure being no more than about 2% higher than at a respective preceding increment. Each successive increment of minimum on-going apply pressure may also be no more than about 1% higher than at a respective preceding increment.

The program may dictate a fail-safe mode of parameters for disabling operation in case of at least one of out of parameter adjustment and detection of a critical fault. The device may control the transmission by timing of an off-going clutch release using the further optimized value. The device may control the transmission by maintaining a low holding pressure on the off-going clutch during a torque phase of a shift to reduce possibility of a tie-up.

According to other aspects, the disclosure is also directed to a vehicle including the transmission control device, powertrain including an engine, a transmission with a plurality of solenoid actuated friction elements, and sensors as noted above.

According to other aspects, the disclosure is also directed to a method of adjusting operating parameters of a transmission of a vehicle, the method including accessing a stored list of clutch parameters; performing a static condition procedure to revise the clutch parameters; and performing a dynamic condition procedure to further revise the clutch parameters. Various options and modifications are possible.

For example, the method may further include the step of directing the operation the vehicle using the further revised clutch parameters. The clutch parameters may include a plurality of lookup tables with transmission control data stored in a memory. The method may be such that the revising and the further revising clutch parameters includes updating the data within the lookup tables, and such that the updating the data includes interpolating data in the lookup tables to create further updated lookup tables.

The method may also include directing the transmission to operate with a short-duration, high-pressure pulse for an on-coming clutch at the beginning of a shift, and may include dictating a fail-safe mode of parameters for disabling operation in case of at least one of out of parameter adjustment and detection of a critical fault. The method may also include controlling the transmission by timing of an off-going clutch release using the further optimized value, and may also include controlling the transmission by maintaining a low holding pressure on an off-going clutch during a torque phase of a shift to reduce possibility of a tie-up.

The clutch parameters may include a minimum on-going apply pressure for friction elements and a maximum off-going apply pressure for friction elements. The method may include adjusting clutch parameters after the self-learning procedure based on shift feel.

The static condition procedure may be performed incrementally with each successive increment of minimum on-going apply pressure being about 10% higher, about 5% higher, or about 2% higher than at a respective preceding increment. After the static condition procedure, a second static condition procedure may be performed incrementally with each successive increment of minimum on-going apply pressure being about 2% higher than at a respective preceding increment. Also, the static condition procedure may be performed incrementally with each successive increment of minimum on-going apply pressure being a first incremental value higher than at a respective preceding increment, and wherein after the static condition procedure, a second static condition procedure is performed incrementally with each successive increment of minimum on-going apply pressure being a second incremental value smaller than the first incremental value and higher than at a respective preceding increment.

The dynamic condition procedure may be performed incrementally with each successive increment of minimum on-going apply pressure being no more than about 2% higher, or no more than about 1% higher than at a respective preceding increment. The static condition test may include adjusting a maximum off-going apply pressure for the friction elements until an initial optimized value is determined based on a sensed friction element performance.

The dynamic condition test may include adjusting a maximum off-going apply pressure for the friction elements until a further optimized value is determined based on a sensed performance of an element within a powertrain of the vehicle. The method may further include adjusting in a real-time, closed-loop manner the pressure ramp rate during the execution of a shift, as well as dictating a fail-safe mode of parameters for disabling operation in case of at least one of out of parameter adjustment and detection of a critical fault.

The method may also include controlling a timing of an off-going clutch release using the further revised clutch parameters, and maintaining a low holding pressure on an off-going clutch during a torque phase of a shift to reduce possibility of a tie-up, as well as controlling the transmission so as to selectively start in gear ratios other than the lowest forward gear, and further may include adjusting the transmission so as to lock the transmission while the vehicle is stopped by applying a plurality of friction elements. The method may be performed without performing the static learning procedure.

According to certain other aspects of the disclosure, a transmission control device is disclosed for a vehicle having a powertrain including an engine, a transmission with a plurality of solenoid actuated friction elements, and sensors, the device including at least one connection for transmitting signals to and from the engine, the transmission, and the sensors within the vehicle; and a memory for storing a program for adjusting and controlling the transmission and data including friction element apply pressure data. The program stores a minimum on-coming apply pressure for each of the friction elements in the memory as initial optimized values, directs the powertrain to perform a dynamic condition procedure while the vehicle is being driven to determine a modified minimum on-coming apply pressure for each of the friction elements based on a sensed performance of an element within the powertrain, stores the modified minimum on-coming apply pressures in the memory as further optimized values, after completion of the dynamic condition procedure, and controls the transmission during operation of the vehicle using the further optimized values. Various options and modifications are possible.

For example, the sensed performance may be a ratio slip RPM ramp rate. The device may further include a housing in which the memory is mounted and to which the at least one connection is connected, and/or a user input device separate from and in communication with the housing, the user input device having a display and at least one input element. The data may include a plurality of lookup tables with transmission control data stored in the memory.

The program may direct the transmission to operate with a short-duration, high-pressure pulse to each friction element at the beginning of a shift. The program may direct the powertrain to perform a static condition procedure while the vehicle is stationary by incrementally increasing the on-coming apply pressure for each of the friction elements sequentially until a minimum on-coming apply pressure is determined for each of the friction elements based on a sensed friction element performance, the program storing the determined minimum on-coming apply pressures in the memory as the initial optimized values. The static condition procedure may be performed incrementally with increments, wherein each successive increment is about 10% higher than at a respective preceding increment, and if desired each successive increment may be no more than about 5% higher than at a respective preceding increment. During the static condition procedure, after the initial optimized values are determined using a first increment, the program may again direct the powertrain to perform the static condition procedure incrementally using a second increment smaller than the first increment to determine the minimum on-coming apply pressures to be stored in the memory as the initial optimized values. The static condition procedure may further include adjusting a maximum off-going apply pressure for each of the friction elements sequentially until a maximum off-going apply pressure is determined for each of the friction elements based on a sensed slippage for each of the friction elements, and storing the determined maximum off-going apply pressures in the memory as initial optimized off-going values.

The dynamic condition procedure may be performed incrementally with each successive increment of minimum on-coming apply pressure being no more than about 2% higher than at a respective preceding increment. The dynamic condition procedure may further include determining a modified maximum off-going apply pressure for each of the friction elements based on a sensed slippage for each of the friction elements, storing the determined modified maximum off-going apply pressures in the memory as further optimized off-going values, the program controlling the transmission during operation of the vehicle using the further optimized off-going values.

The program may dictate a fail-safe mode of parameters for disabling operation of the transmission in case of at least one of out of parameter adjustment and detection of a critical fault.

According to certain other aspects of the disclosure, a method is disclosed of adjusting and using operating parameters of a transmission of a vehicle, the transmission having a plurality of friction elements, the method may include the steps of accessing a stored list of clutch parameters including a minimum on-coming apply pressure for each of the friction elements stored as initial optimized values in the stored list of clutch parameters; performing a dynamic condition procedure while the vehicle is driven to revise the clutch parameters, the dynamic condition procedure including determining a modified minimum on-coming apply pressure for each of the friction elements based on a sensed performance of an element within the powertrain; storing the modified minimum on-coming apply pressure as further optimized values in a revised list of clutch parameters; and operating the vehicle using the revised list of clutch parameters. Various options and modifications are possible.

For example, the additionally adjusting step may include adjusting a ratio slip RPM ramp rate. The clutch parameters may include a maximum off-going apply pressure for each of the friction elements.

The method may further include performing a static condition procedure while the vehicle is stationary to revise the clutch parameters before performing the dynamic condition procedure, the static condition procedure including incrementally increasing the on-coming apply pressure for each of the friction elements in the transmission until the minimum on-coming apply pressure is obtained for each of the friction elements and storing the determined minimum on-coming apply pressures as the initial optimized values. The static condition procedure may be performed incrementally with each successive increment of minimum on-coming apply pressure being about 10% higher than at a respective preceding increment. If desired, the each successive increment may be no more than about 5% higher than at a respective preceding increment. During the static condition procedure, after the initial optimized values are determined using a first increment, a second static condition procedure may be performed incrementally using a second increment smaller than the first increment to determine the minimum on-coming apply pressures to be stored in the memory as the initial optimized values. The static condition procedure may further include adjusting a maximum off-going apply pressure for each of the friction elements sequentially until a maximum off-going apply pressure is determined for each of the friction elements based on a sensed slippage for each of the friction elements, the method further including storing the determined maximum off-going apply pressures as initial optimized off-going values in the revised list of clutch parameters.

The dynamic condition procedure may be performed incrementally with each successive increment of minimum on-coming apply pressure being no more than about 2% higher than at a respective preceding increment. The dynamic condition procedure may further include determining a modified maximum off-going apply pressure for each of the friction elements based on a sensed slippage for each of the friction elements, the method further including storing the determined modified maximum off-going apply pressures as further optimized off-going values in the further revised list of clutch parameters.

The method may further include dictating a fail-safe mode of parameters for disabling operation of the transmission in case of at least one of out of parameter adjustment and detection of a critical fault, and/or adjusting in a real-time, closed-loop manner a pressure ramp rate during the execution of a shift, and/or controlling the transmission so as to selectively start in a gear other than a lowest forward gear, and/or adjusting the transmission so as to lock the transmission while the vehicle is stopped by applying a plurality of the friction elements, and/or additionally adjusting the clutch parameters after the dynamic condition procedure based on shift feel.

BRIEF DESCRIPTION OF THE DRAWINGS

More details of the present disclosure are set forth in the drawings.

DETAILED DESCRIPTION

Figure 1:
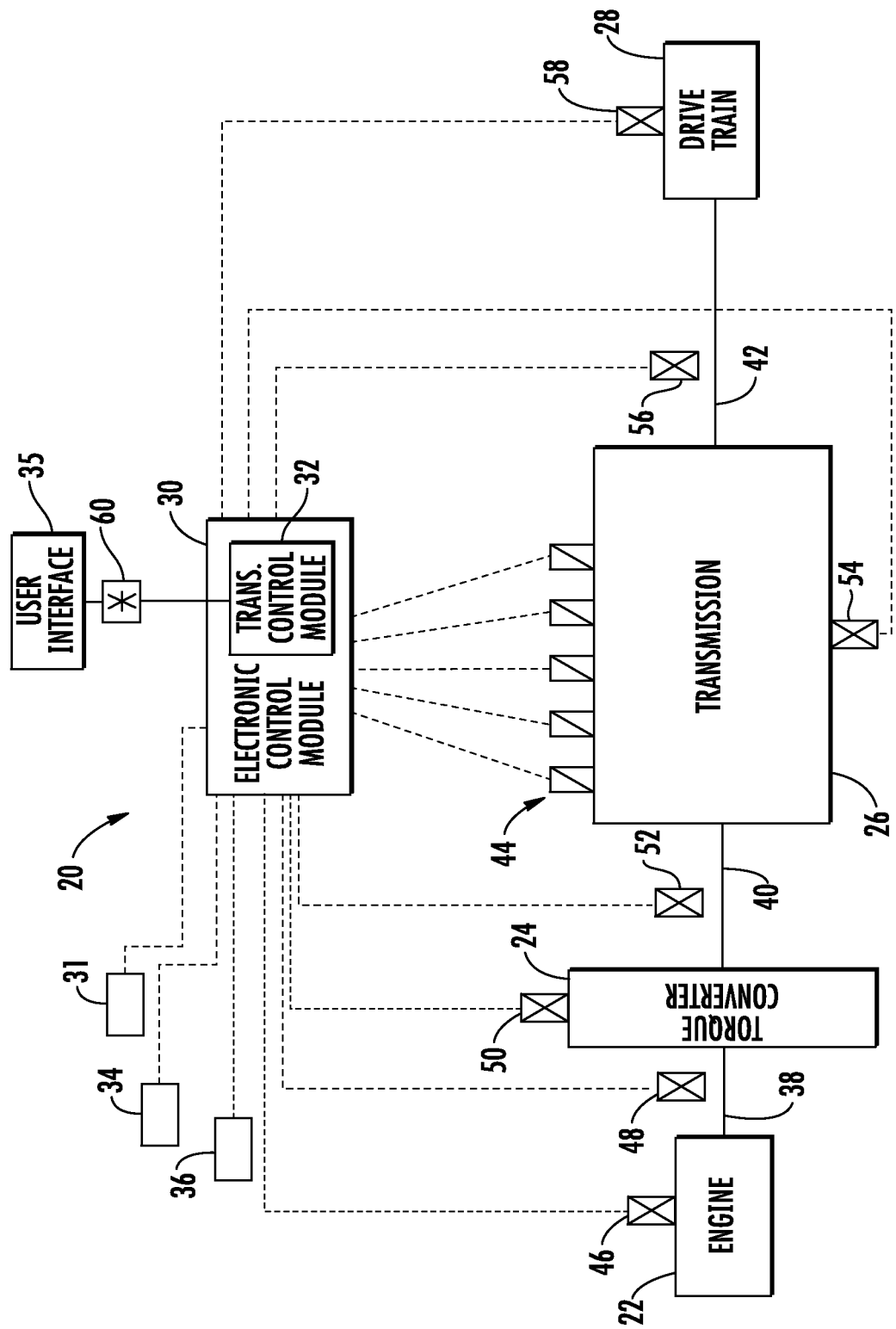
FIG. 1 is a schematic view of a system including a vehicle with an engine, transmission, control equipment, etc., as well as components of the present system for adjusting the transmission operation.

Detailed reference will now be made to the drawings in which examples and flowcharts embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

Generally speaking, the disclosure is directed to examples of systems and methods for calibrating transmissions, such as C2C transmissions. For clarity and reference, Applicant sets for the following definitions which are employed in the disclosure below.

Definitions

Synchronous Shift: A shift that occurs in a stepped automatic transmission, where one friction element (clutch or band) for a given gear ratio must be released while the friction element for the next gear ratio must be applied simultaneously. The timing and coordination of these events must be synchronized properly to avoid the effects of "flare" and "tie-up" (see below). One-way clutches were historically employed in automatic transmissions to allow shift events to be non-synchronous, but they do not allow engine braking, while increasing weight, cost, and complexity. Therefore, most modern C2C transmissions employ few, if any, one-way clutches, and rely primarily on synchronous shifts.

Fail-Safe Mode: When all electrical power is removed from the solenoids in the transmission, most C2C transmissions will operated in a fixed gear mode, that is intended to allow limited vehicle operation, so that the driver will not be stranded and can safely return home or to a service facility. The details of this mode of operation vary by transmission model, but typically entail operation with full line pressure, no torque converter clutch engagement, a fixed gear ratio in forward ranges (typically between third and fifth gear), and a functional reverse gear. Fail-safe mode can be engaged under firmware control by removing all power from the solenoid circuits. This feature is also known as "default mode" or "limp home mode."

Flare: A condition that occurs during a synchronous shift when the hydraulic pressure at either of the transitioning friction elements is not great enough to carry the current engine torque. As a result, engine RPM (revolutions per minute) rises above the speed that it would normally be at in either the incoming or outgoing gear ratio, creating a feeling that the transmission is in neutral. This condition is also known as "cut-loose."

Tie-up: A lock-up condition of the transmission that is caused by too many clutches being applied at once (or being engaged in two gears at once), effectively locking the input and output shafts to the transmission case. This condition can be caused by too much pressure on the off-going friction element during a synchronous shift.

Torque Phase: Beginning portion of a shift event, when torque is being transferred from the off-going clutch to the on-coming clutch, but no significant changes in transmission shaft speed occur.

Fill Phase: Prelude to a shift event, when the clutch piston or band servo is filled with fluid, begins to stroke, and the friction materials begin to make contact with their mating surfaces.

Inertial Phase: Primary dynamic portion of a shift event, when measurable transmission shaft speed changes are occurring.

Static Phase: End portion of a shift event, when static friction of the on-coming friction element takes over, and transmission speed ratio error effectively drops to zero RPM (revolutions per minute).

Components of System and Method:

The discussion of technologies below related to various aspects of the present invention can be divided into four components. It should be understood that the present disclosure is directed to various methods, systems, kits, transmission components and adjustments, etc., so the four items below are simply for convenience in organizing the discussion below.

Figure 2:
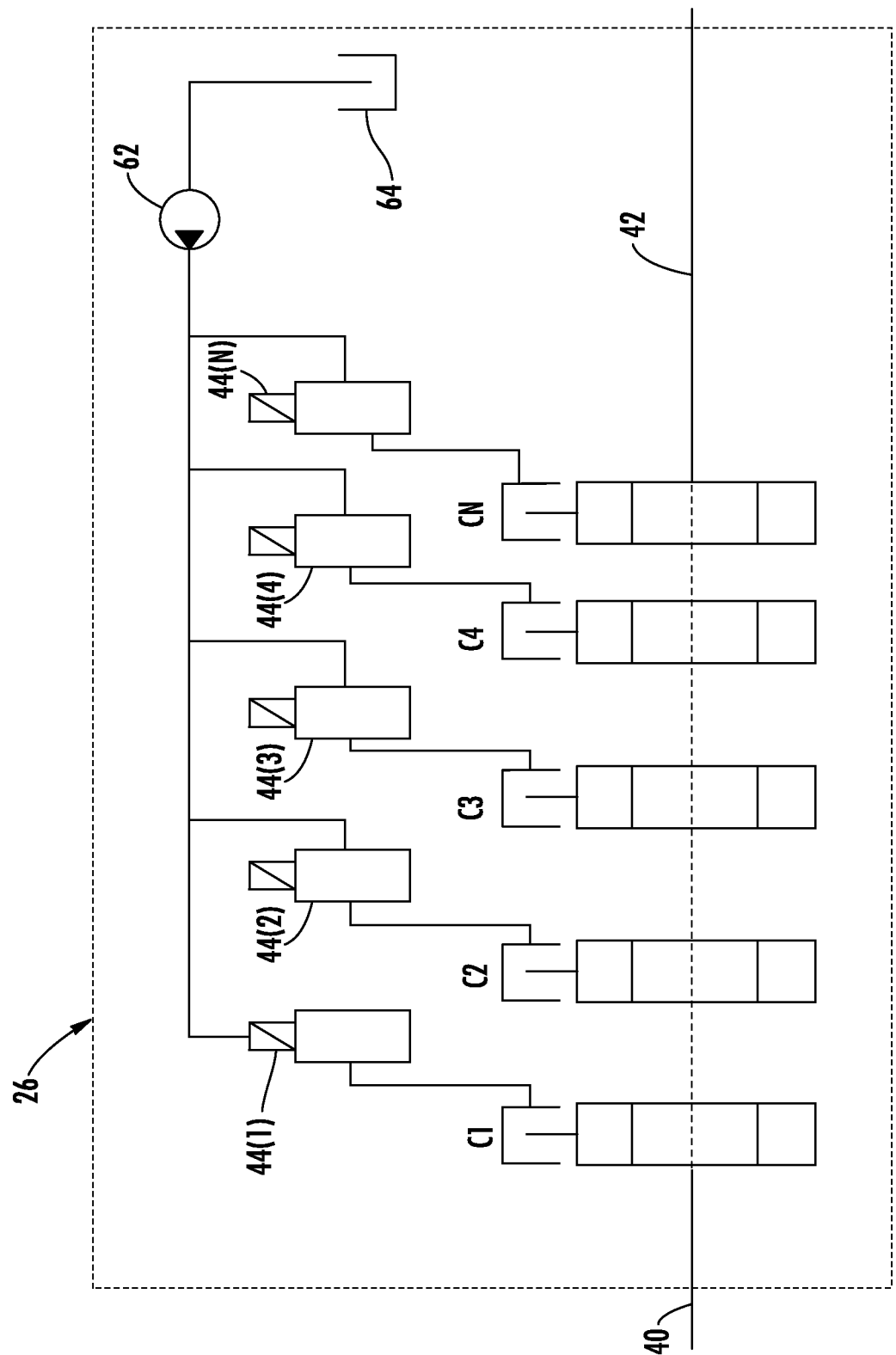
FIG. 2 is a diagrammatical representation of a typical transmission.
Figure 3A:
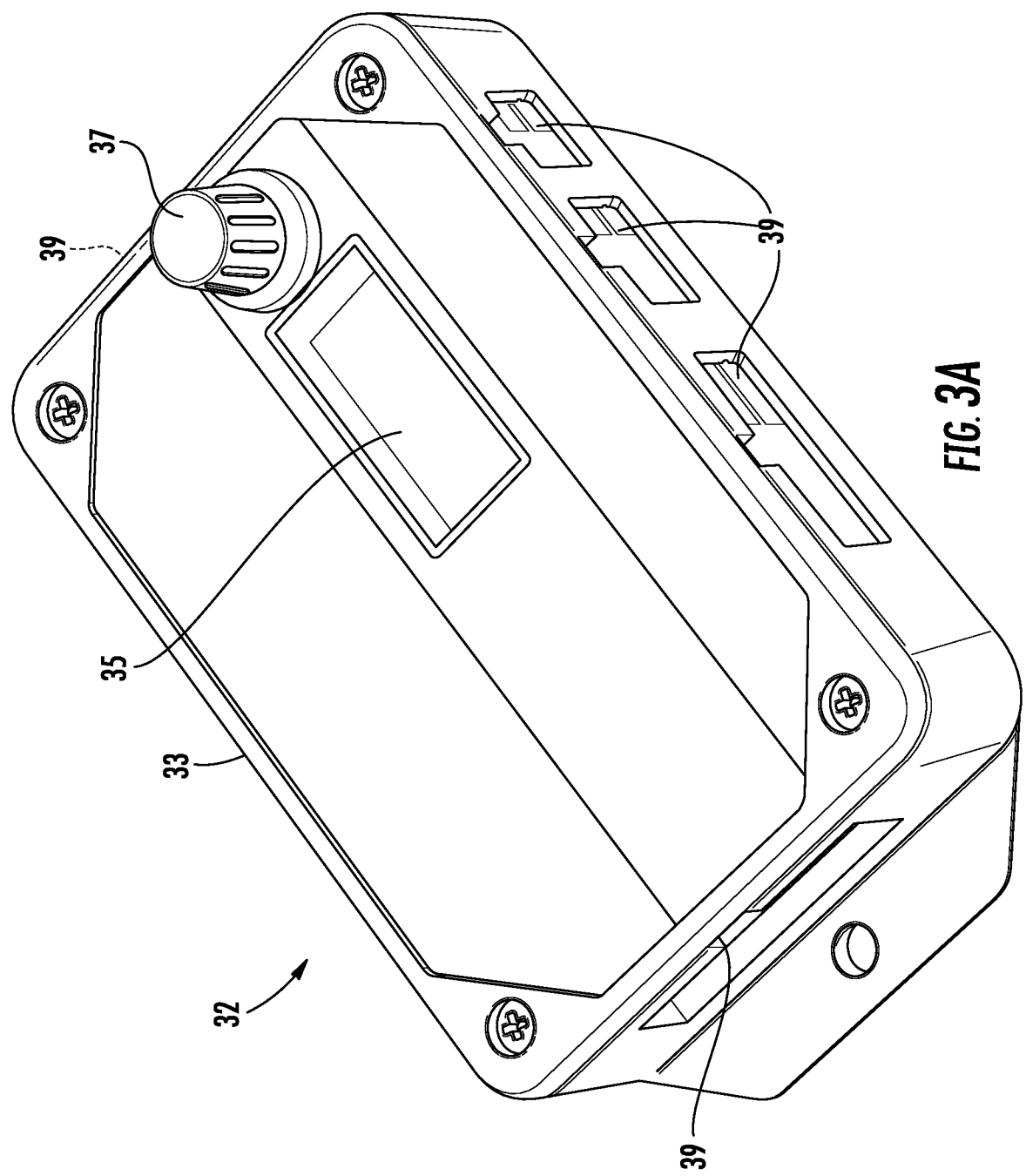
FIG. 3A is a perspective view of one example of a transmission control module according to certain aspects of the disclosure.
Figure 3B:
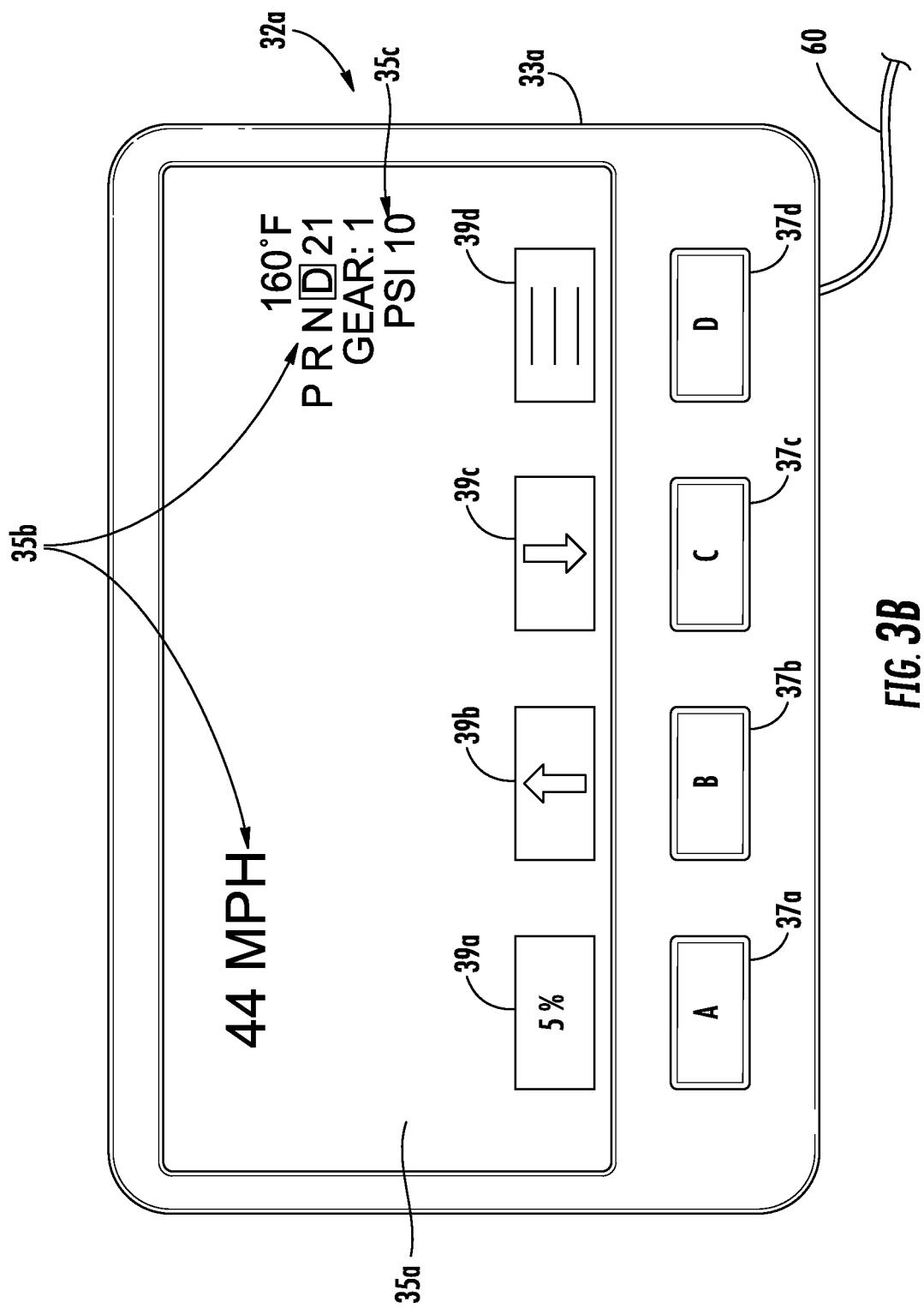
FIG. 3B is a front view of one example of a remote user interface usable with the transmission control module of FIG. 3A or variations of such unit.
Figure 4:
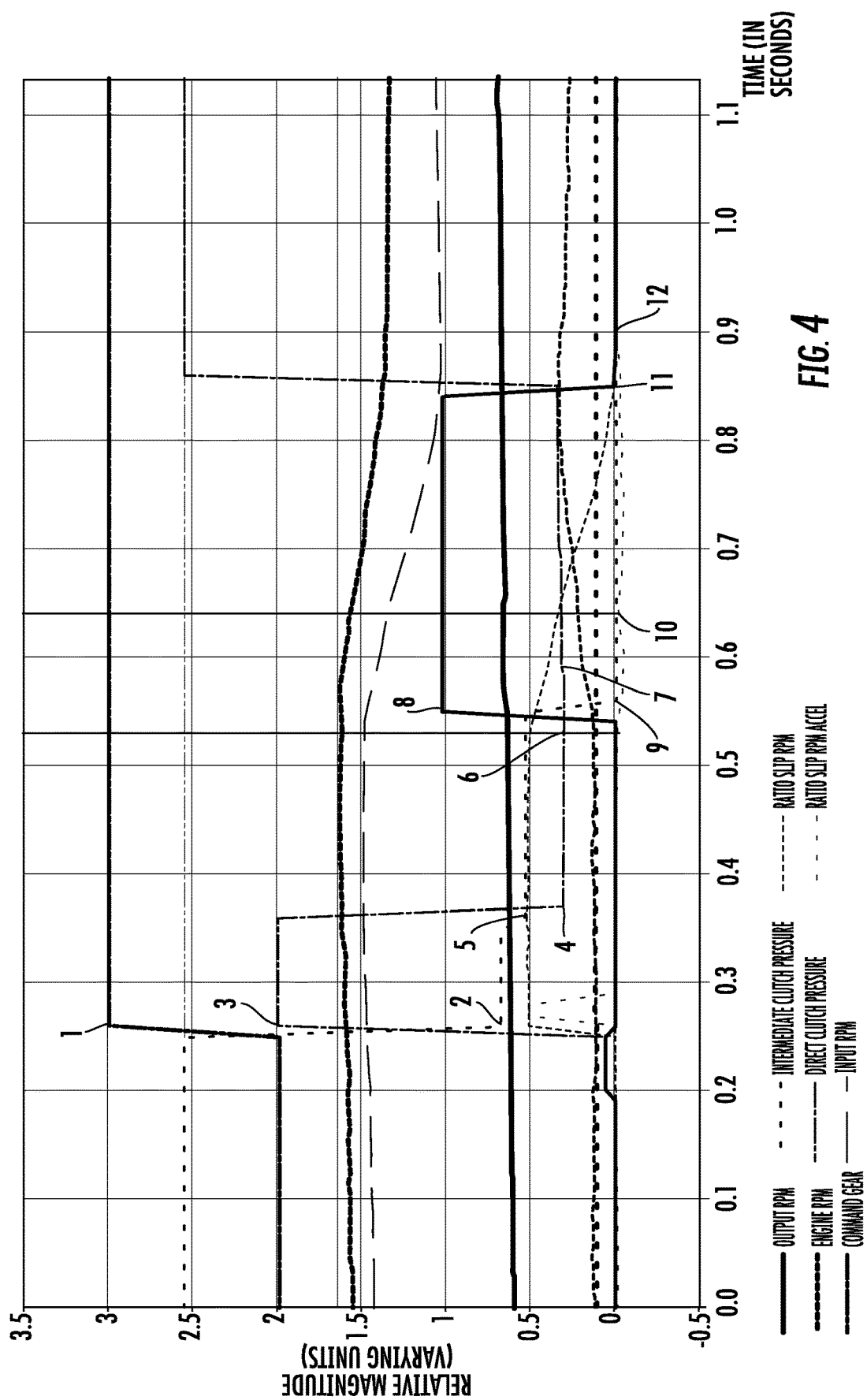
FIG. 4 is a graph showing various transmission parameters during a shift.
Figure 7:
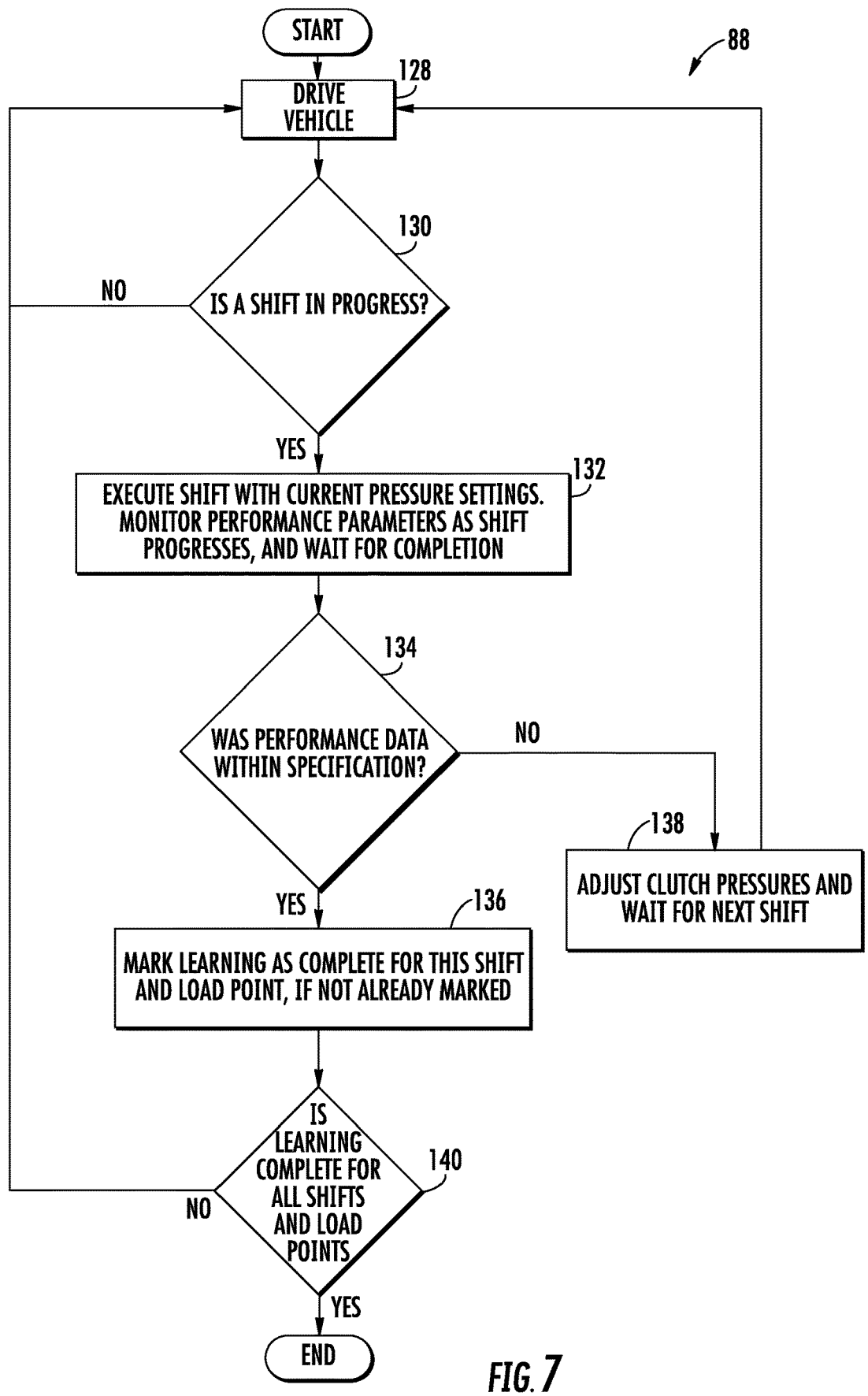
FIG. 7 is a flowchart showing a dynamic learning procedure according to certain aspects of the present disclosure.
Figure 8:
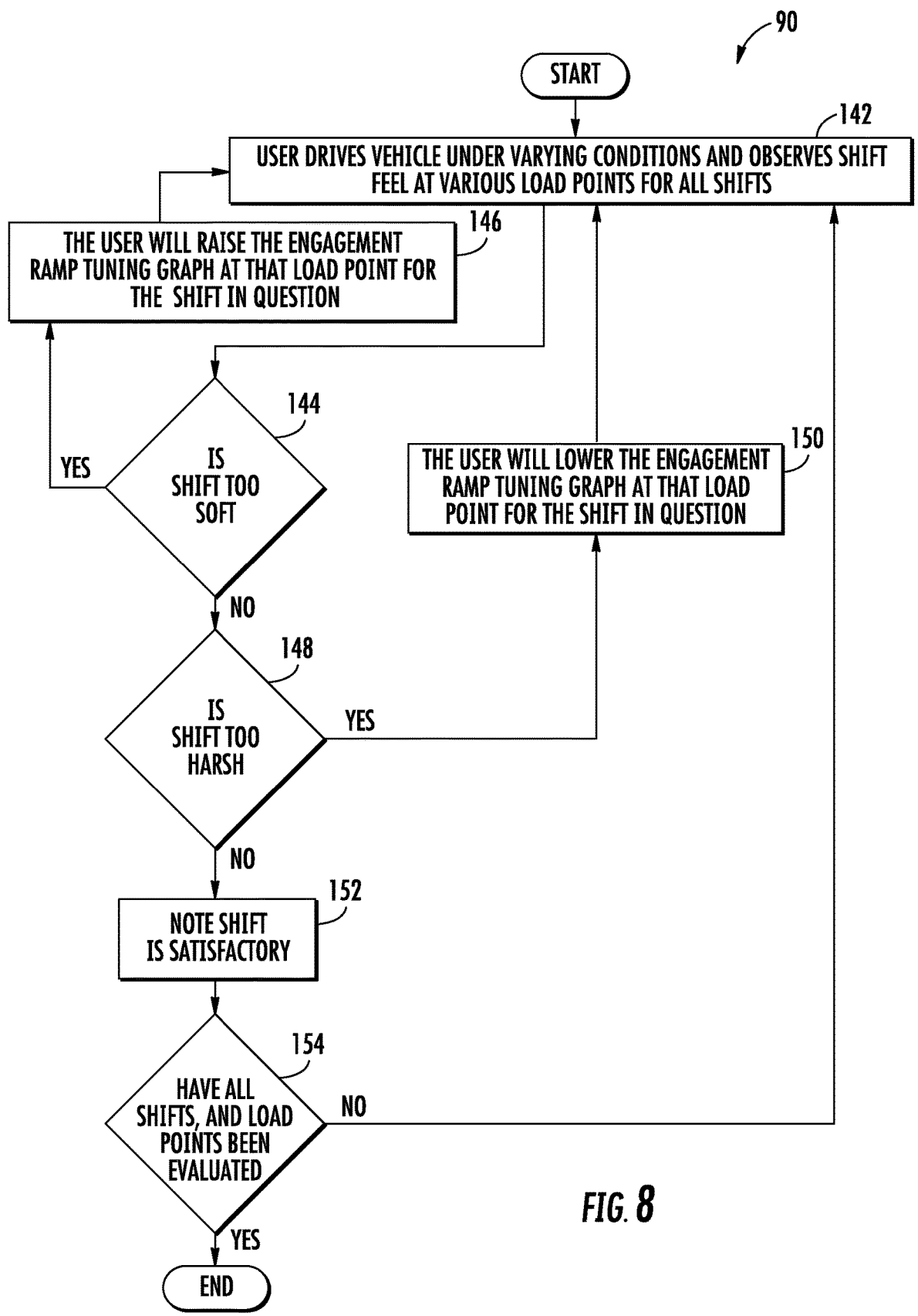
FIG. 8 is a flowchart showing a manual adjustment of on-coming clutch pressure ramp rates according to certain aspects of the disclosure.
Figure 9:
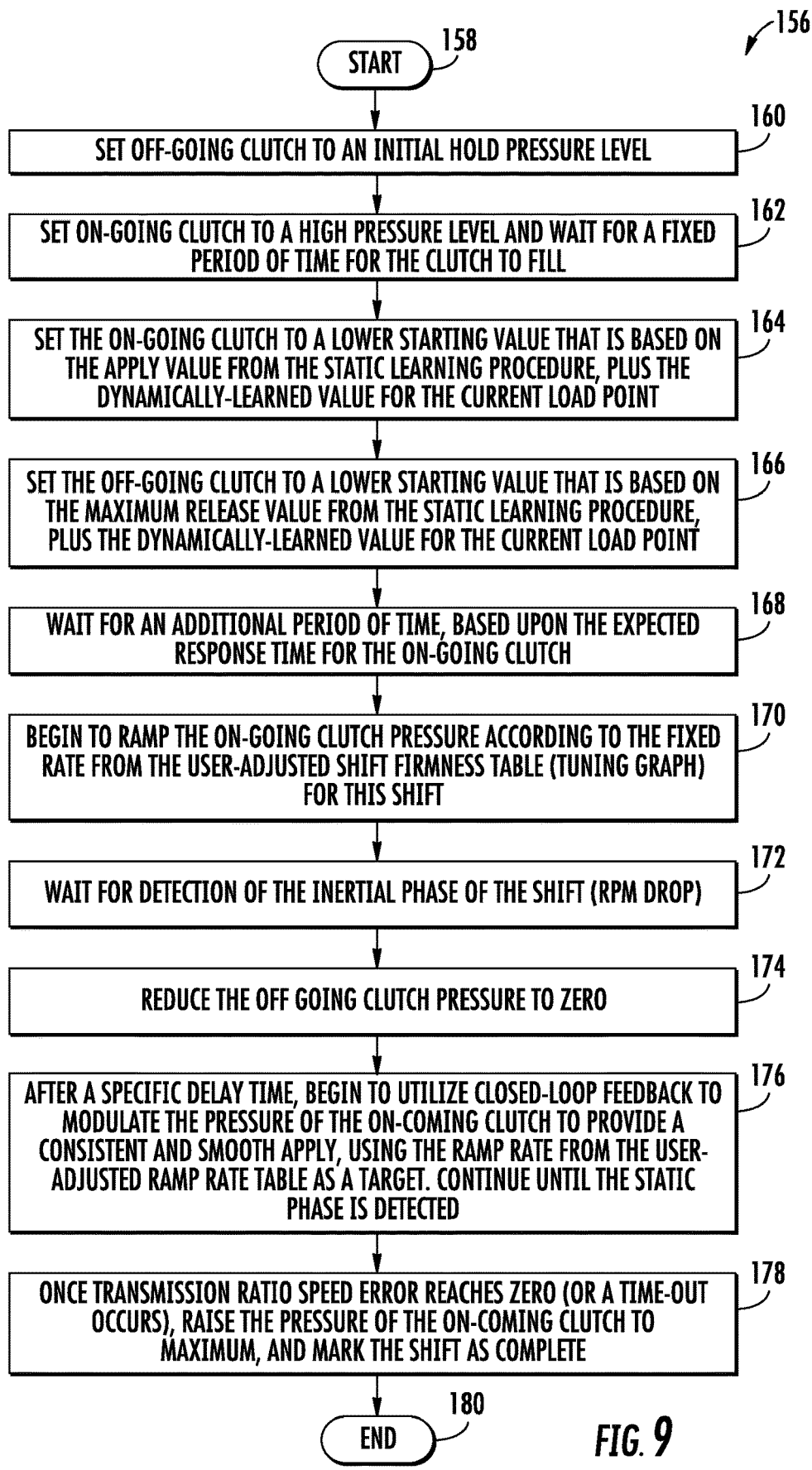
FIG. 9 is a flowchart showing clutch pressure control during shifts according to certain aspects of the present disclosure.
Figure 10:
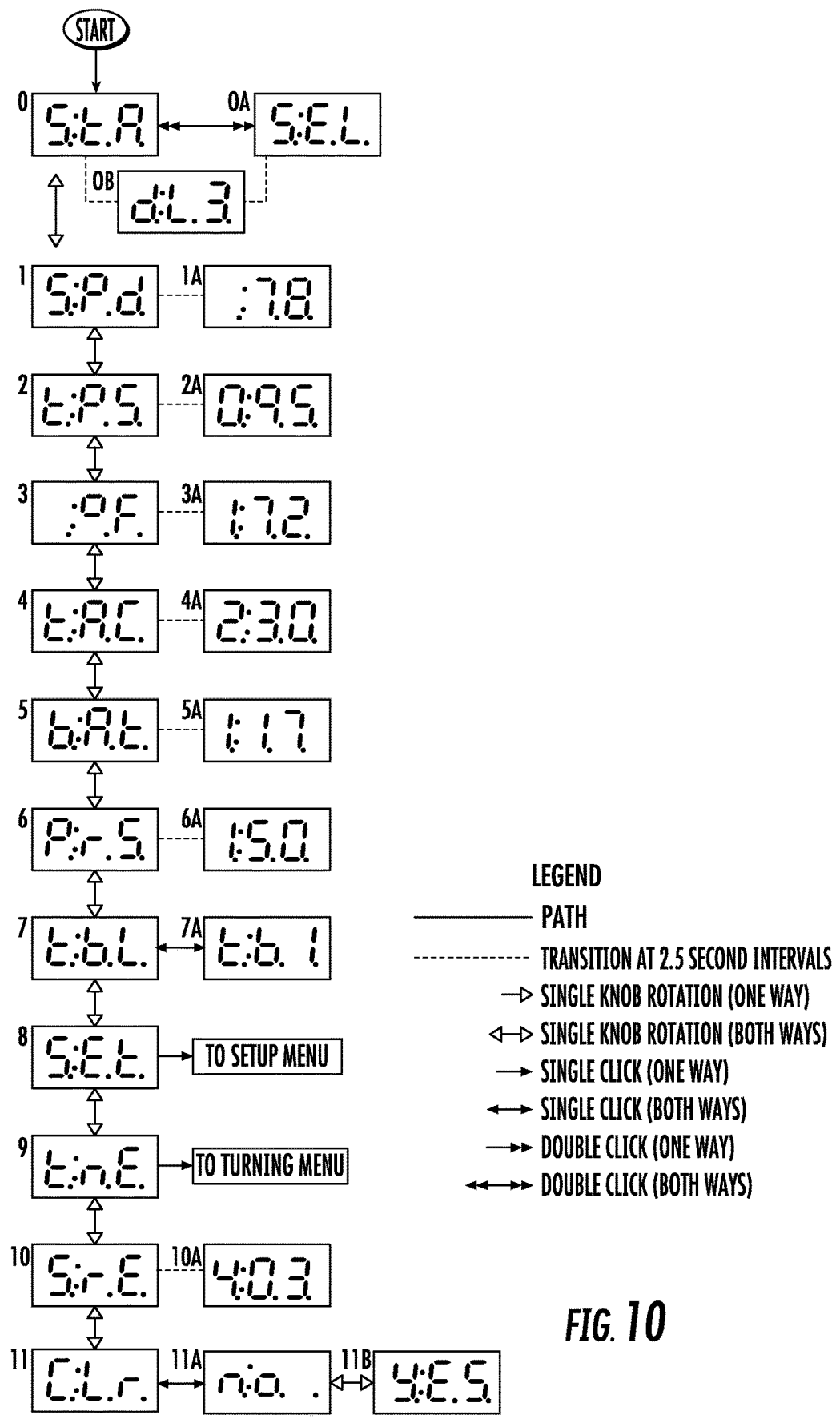
FIG. 10 is a chart schematically outlining one possible overall functional control menu for the user interface according to certain aspects of the present disclosure.
Figure 11:
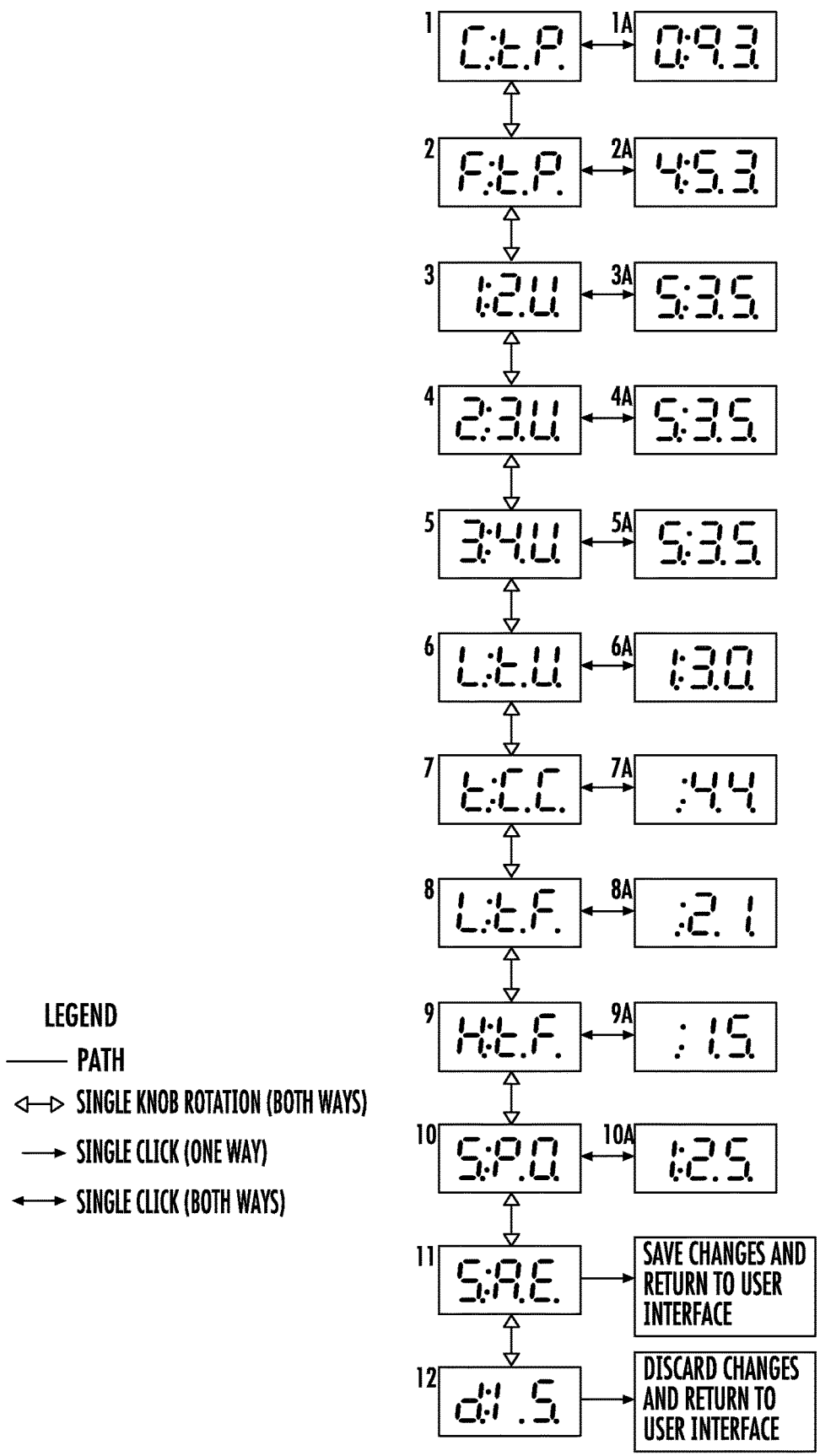
FIG. 11 is a chart schematically outlining one possible overall tuning sub-menu according to certain aspects of the present disclosure.
Figure 12:
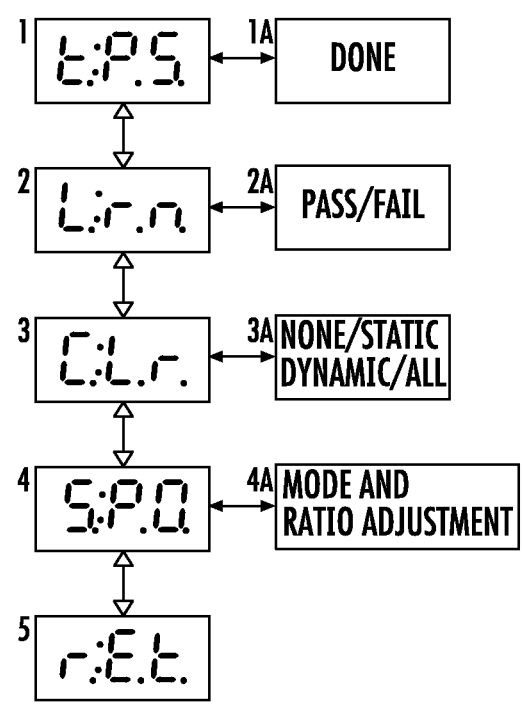
FIG. 12 is a chart schematically outlining one possible static and dynamic tuning set-up sub-menu according to certain aspects of the present disclosure.

FIG. 1 shows schematically certain components of on exemplary embodiment of a vehicle and its transmission, engine, control system and adjustment components as is relevant to the present disclosure. FIG. 2 shows a schematic view of a transmission. FIG. 3A shows one example of a transmission control module useful with certain aspects of the disclosure, and FIG. 3B shows one example of a user interface device that can be used with a transmission control module as in FIG. 3A or others. FIG. 4 show graphs of performance characteristics of the system in the vehicle and as are used in adjusting the characteristics of the transmission according to the present disclosure. FIGS. 5-8 are flowcharts detailing transmission adjustment steps according to the present disclosure, and FIG. 9 is a flowchart showing clutch pressure control during a shift utilizing aspects of the present disclosure. FIGS. 10-12 show examples of a control menu and tuning sub-menus that could be followed using aspects of the present disclosure. It should be understood that the subject matter shown in the figures are only examples set forth for explaining various aspects of the disclosure, and that different or additional subject matter could be employed within the scope of the present invention. For example, different types of vehicles, engines, transmissions, tools, steps, systems and procedures could be employed using aspects of the present disclosure. Thus, the examples shown herein are not intended to be limiting.

More particularly, system 20 of FIG. 1 includes an engine 22, a torque converter 24, an automatic transmission 26, a drive train 28, a vehicle electronic control module 30 (sometimes also called an engine control module), a transmission control module 32 with an optional remote user interface 32a, and driver inputs 36 (e.g., accelerator, brake pedals).

Although there are various ways the following items can be configured on older and newer vehicles, also shown are a manual or automatic mode selector/gearshift input 31 (e.g., for choosing a mode/gear such as P, R, N, D, 1, 2, etc.) and an optional manual shift input 34 (e.g., shift paddles for controlling shifting for an automatic transmission when in forward gears). In an older vehicle, element 31 could be an automatic transmission or manual transmission gearshift. In a newer vehicle, element 31 could be a mechanical, electro-mechanical or electrical device (shifter, switch or other input) for indicating desired mode/gear. In some newer vehicles, the functions of elements 31 and 34 are combined into a single unit. Aftermarket modifications may also alter an original set-up from one above type to another. It should be understood that the present disclosure is not limited to any type of transmission mode or gear control, or any particular type of inputs and controls for such.

Engine output shaft 38 is connected to one side of torque converter 24, and transmission input shaft 40 is connected to the other side of torque converter 24. Transmission output shaft 42 provides the input to drive train 28. A number of clutch pressure control solenoids 44 are provided as per the needs of transmission 26, its number of gear ratios, the design of the transmission, etc.

Sensors 46, 48, 50, 52, 54, 56 and 58 (OEM or aftermarket) may be provided throughout and along the power train (from the engine, though the transmission to the drive train). Although only one sensor is shown schematically at each location along the power train, it should be understood that multiple sensors for sensing multiple parameters could be employed along the power train as desired. In particular, within transmission 26, sets of sensors may be employed corresponding to each solenoid/clutch combination, etc.

There are several options within the scope of the disclosure for the schematically-illustrated electronic control module 30 and transmission control module 32, with or without a remote user interface 32a, depending on the characteristics of the subject vehicle. For example, most currently manufactured vehicles include a single, unitarily constructed electronic control unit having both an engine controller and a transmission controller. That is, one control unit includes within a housing or the like a memory, executable software, signaling connectors (sockets or cables) for communicating the unit with relevant portions of the vehicle, etc. The one control unit controls both the engine and the transmission. Second, some vehicles include a separate engine control unit and transmission control unit, each with its own set of the elements noted above as needed for respective functions. Third, some older vehicles, do not include an electronic control unit at all. Of course, in the aftermarket and customized vehicles field, older vehicles are often modified with different transmissions, engines, control systems, etc. Therefore, whatever the OEM or modified version of the vehicle at hand, the present disclosure provides a transmission control module and method that can be adapted to the vehicle.

Transmission control module 32 as illustrated in FIG. 3A is an adjustable stand-alone transmission control module. Transmission control module 32 can be attached to the vehicle and its systems in different ways, depending on the characteristics of the subject vehicle. First, if the vehicle originally has an all-in-one engine and transmission controller, transmission control module 32 can be installed on the vehicle and embodied in a device such as is shown in FIG. 3A. In such case, transmission control functions of the existing electronic control module 30 can be disabled or the engine control module can be replaced with a model not including or activating transmission control function. If the subject vehicle originally includes separate engine and transmission controller modules, the existing transmission control module can be replaced by module 32 of FIG. 3A. If no engine or transmission control module is originally present, a transmission control module 32 as in FIG. 3A can be added, perhaps with an engine control module depending on the other customized work being done. Transmission control module 32 could also be part of an aftermarket all-in-one engine and transmission control unit.

Typically, transmission control module 32 would be placed within the driver compartment (whether in an exposed location such as mounted to or below the dashboard, or in a coverable location such as a glove compartment, arm rest, etc.). Certain connections to engine elements may be connected to transmission control module 32, as needed, and this may include disconnecting wires from electronic control module 30 and reconnecting to transmission control module 32, or adding new connections to the elements of between the engine and transmission control modules.

For sake of clarity, FIG. 1 schematically shows transmission control module 32 drawn within electronic (engine) control module 30, but that is meant to indicate only that the various connections, wiring harness, CAN bus, etc., coming from throughout the vehicle may be fed into one or both of the electronic control module 30 (if present) and the transmission control module 32. As noted above, transmission control module 32 is typically mounted within the passenger compartment in reach of the driver's seat, and not mounted within, atop or in any way directly to engine control module 30 which is elsewhere.

As illustrated in FIG. 3A, transmission control module 32 includes a housing 33 with a display 35, and a multifunction (rotatable and clickable) dial 37. Sockets 39 of various types can be provided in housing 33 for receiving plug-in wire connectors. For example, a first of the sockets 39 may provide a connection to the vehicle wiring harness, which contains all of the electrical power and signals from other areas of the vehicle to allow the controller to operate. This connection may for example provide ground, +12V power, the throttle position sensor signal, a +5V power source for a stand-alone throttle position sensor, engine tachometer signal, manual shift control inputs, a ratio-adjustable speedometer signal output, a backup lamp control output, a neutral safety (starter interlock) output, and a tune table selection or 4-wheel drive mode input. This wiring harness connection may also include a transmission mode switch input (such as Auto/Manual, Overdrive On/Off, etc.) and corresponding indicator lamp output if included in the vehicle, or various other options.

Another socket 39 may provide connection for powering the transmission solenoids, and may receive signals from the transmission fluid temperature sensor. Another socket 39 may provide a connection for receiving the signal from the "mode selector" or "shifter" sensor. Another socket 39 may provide a connection to receive signals from the input and output shaft speed sensors. Another socket 39 may provide a connection to remote user interface 32a, which may be a dedicated device as in FIG. 3B. This socket or an additional one can be used to communicate with a PC, tablet, smartphone, etc. as an alternate or additional user interface device. Other connections to a user interface device 32a or an alternate user interface device, such as asynchronous serial, CAN, wireless, or any other connection type may alternately be utilized within transmission control module 32. Remote user interface 32a can also be embodied as a wired or wirelessly connected computer, PC, tablet, smartphone, etc. Thus, connection 60 schematically embodies all such connections to all such user interface devices 32a.

As shown in FIG. 3B, one broadly-disclosed embodiment of a user interface device 32a is an input-output device having a housing 33a, a display such as one or more LED, LCD or other screens 35a, and input devices 37a-d such as touch-screen (virtual) or dedicated buttons respectively related to related display portions 39a-d. User interface device 32a is connected to transmission control module 32 (or engine control module 30) via a wired or wireless connection 60.

Display 35a may include for example various indicia 35b related to the state of the engine and transmission, as well as at least one indicator 35c related to a parameter subject to adjustment by buttons 37a-d as indicated by respectively related elements 39a-d. As shown in FIG. 3B, button 37d could call up or toggle through a menu (indicated in element 39d), while button 37a could toggle an adjustment (displayed in element 39a) between percentage and PSI. As indicated by display elements 39b and 39c, buttons 37b and 37c could respectively increment or decrement the parameter identified in display element 35c by the amount indicated in display element 39a. Of course, the above is but one of the numerous display arrangements possible using user interface device 32a, and many other arrangements are possible. For example, display 35a could also show graphically or by numerical label the "location" within the menu and sub-menus of FIGS. 10-12 of the information being displayed in elements 35c, 39a-d or others. The functionality and adjustments possible with either of devices 32 or 32a are described in more detail below.

As stated, transmission control module 32 can be mounted in vehicle 20 where reachable by a person in the driver's seat. Because as noted above many wiring connections are fed to housing 33 of transmission control module 32, it may be desirable to keep housing 33 more out of the way and to provide a user interface 32a to the user in communication with transmission control module 32. For example, transmission control module 32 could be mounted under-hood or under-vehicle with communication to user interface 32a. Such user interface 32a may supplement or replace display 35 and input device(s) 37 on transmission control module 32. User interface device 32a can be placed in a location reachable and visible to a person in the driver's seat. Thus, transmission control module 32 could be selectively hidden out of view in a glove compartment, arm rest, or the like, or it could be mounted in a more concealed under dash, under seat, etc., location, while user interface 32a could be for example mounted to the dash, kept in a glove box and viewed or pulled out as needed. User interface 32a could be connected to transmission control module 32 by hardwired or local or remote wireless (Bluetooth, Wi-Fi, or other) connection. Regardless of whether elements 32 and/or 32a are used for input and display, such device is preferably locatable so that user interface device 32a can be reachable in the vehicle driver's seat during tuning, so that a user may employ conventional vehicle controls (e.g., 31, 34, 36) and read displays such as a gear indicator, an odometer, etc. inside the vehicle.

It should be understood that user interface device 32a as illustrated and described above may be embodied in any sort of input-output capable user interface with a display such as a video screen, segmented digital display, etc., and input capability such as a touch screen, keyboard, mouse, dedicated buttons or dials, etc. Thus, user interface device 32a could be a general purpose computer, laptop computer, "smart" cellphone, tablet or other such device, a dedicated scan tool, or other special purpose computer or interface device, in either case along with peripheral devices. User interface device 32a, like transmission control module 32, may thus include a volatile and/or non-volatile memory, processor, storage, software such as an operating system and executable software, applications, etc., network adapters, graphics adapters, etc. Electronic control module 30 may be a conventional OEM-supplied engine controller with or without transmission control function, or a separate engine controller and transmission controller. Electronic control module 30 may include similar components as noted above for user interface device 32 as needed to control, capture performance characteristics and output such information, and modify operational settings for transmission 26. Electronic control module 30 may also be an aftermarket controller customized for modification of transmission characteristics, or may be a hybrid of an OEM controller module with an add-on aftermarket controller module.

As stated, user interface device 32a may be connected to transmission control device 32 and/or electronic control module 30 via connection 60, which may be one or more of a permanent or disconnectable plug-in connection, a local wireless (e.g., Wi-Fi, Bluetooth, or other) connection, a remote wireless (e.g., internet, cellular data, or other) connection, or combinations thereof. Thus, the illustration of user interface device 32a and connection 60 in combination with and transmission control module 32 and electronic control module 30 of FIG. 1 schematically represents all such options.

It should be understood that FIG. 1 is meant to be schematic and does not include all elements of the associated vehicle, only those necessary to describe aspects of the present disclosure. Engine 22 may be any sort of engine or motor that can be used to drive a vehicle, including but not limited to an internal combustion (gasoline, diesel, or others) engine, an electrical motor powered by a battery, fuel cell or generator, a hybrid, etc. Torque converter 24 may be any sort of fluid and/or mechanically coupled device between engine 22 and transmission 26, although sometimes a torque converter is considered part of an associated transmission. Transmission 26 is a C2C automatic transmission that may for example have any number of desired forward and reverse gear ratios.

FIG. 2 is a highly schematic representation of transmission 26 for transferring an input on shaft 40 to an output on shaft 42. As illustrated, clutch control solenoids 44(1), 44(2) to 44(N) and clutch devices (friction devices which could be a clutch or band) C(1), C(2) to C(N) are provided, where "N" is the number of clutch devices and corresponding solenoids required to operate transmission 26. A pump 62 draws transmission fluid from a reservoir 64, as required when clutch control solenoids 44 operate, as is conventional.

Typically, a transmission will include at least one reverse gear ratio and several forward gear ratios that can be put into action by selective activation and/or deactivation of at least one but typically more than one of the solenoids and clutch devices. Differing combinations of activated solenoids and clutch devices are used to achieve the differing gear ratios according to the design of the transmission. The linear arrangement shown in FIG. 1 is schematic only, and is intended to clearly and simply indicate various interconnections are possible. As discussed above, C2C transmissions employ synchronous shifts in which changing gear ratios involves simultaneously activating at least one solenoid while deactivating at least one other solenoid. It should be understood that the schematic illustration of FIG. 2 is meant to convey the broad application of the inventive concepts herein to many types of transmissions including C2C transmission, and no limitation is meant to be implied by way of the depiction of FIG. 2.

FIG. 4 shows various parameters as are occurring during a shift from gear 2 to gear 3. The X axes show time and the Y axes show a relative magnitude of a given parameter (co-plotted, without units). The plotted lines as indicated are essentially Y vs. time, where Y is: Input RPM (shaft 40), Output RPM (shaft 42), Engine RPM (shaft 38), Commanded Gear (R, $1^{st}$, $2^{nd}$, $3^{rd}$, etc.), Intermediate Clutch Pressure (the hydraulic pressure on one of the clutch assemblies, such as C2 in FIG. 2), Direct Clutch Pressure (the hydraulic pressure on a different clutch assembly, such as C3 in FIG. 2), Ratio Slip RPM (Input RPM−(Output RPM× Ratio of the Current Commanded Gear)), Ratio Slip RPM Acceleration (the rate of change of the Ratio Slip RPM over a recent period of time, e.g. most recent 20 milliseconds). The plotting of these parameters is somewhat conventional and the plots speak for themselves, but aspects related to the inventive concepts herein will be discussed in further detail below, with reference to the methods of the following flowcharts.

Figure 5:
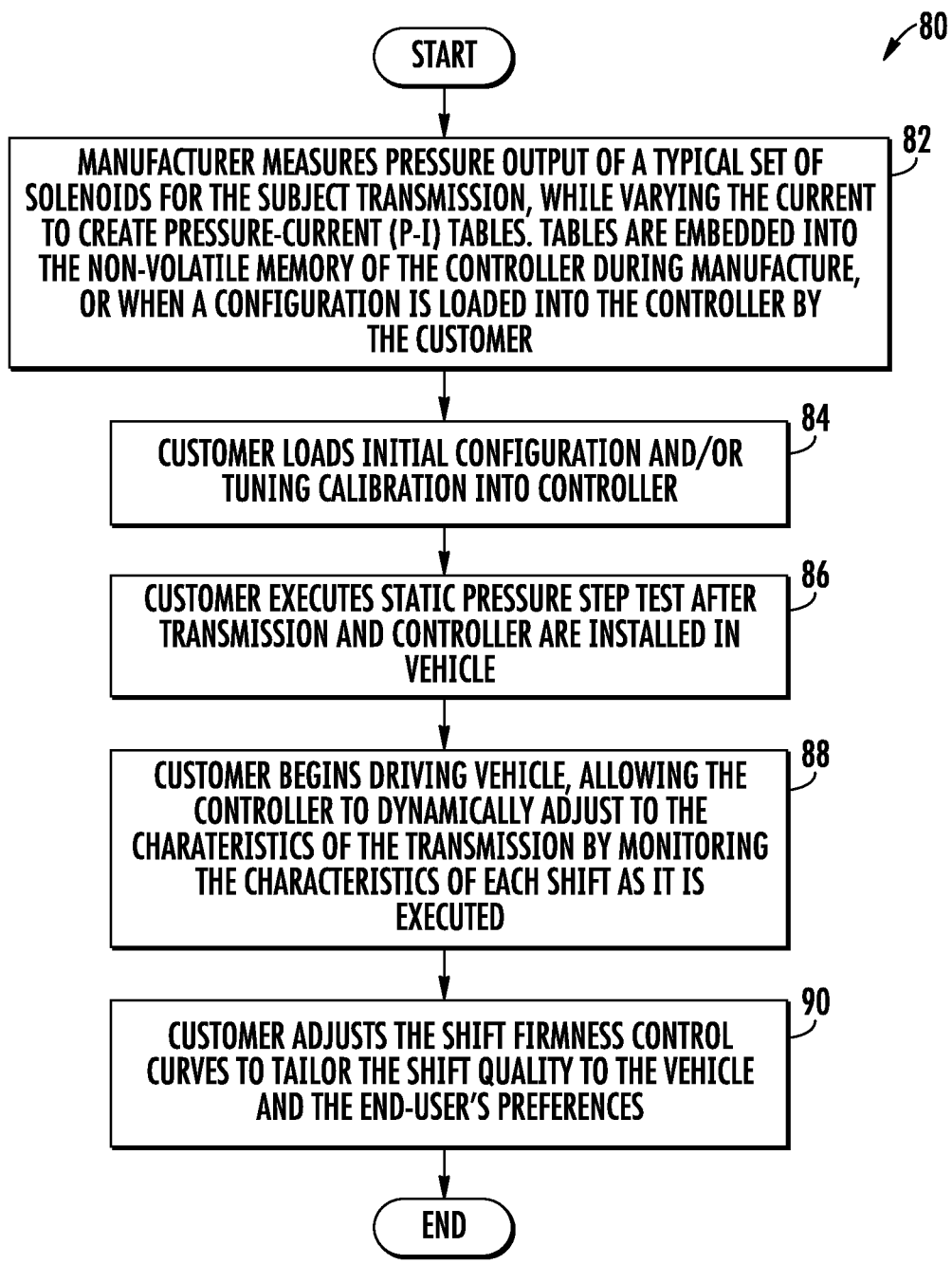
FIG. 5 is a flowchart showing an overview of one method of adjusting various transmission parameters according to certain aspects of the disclosure.
Figure 6:
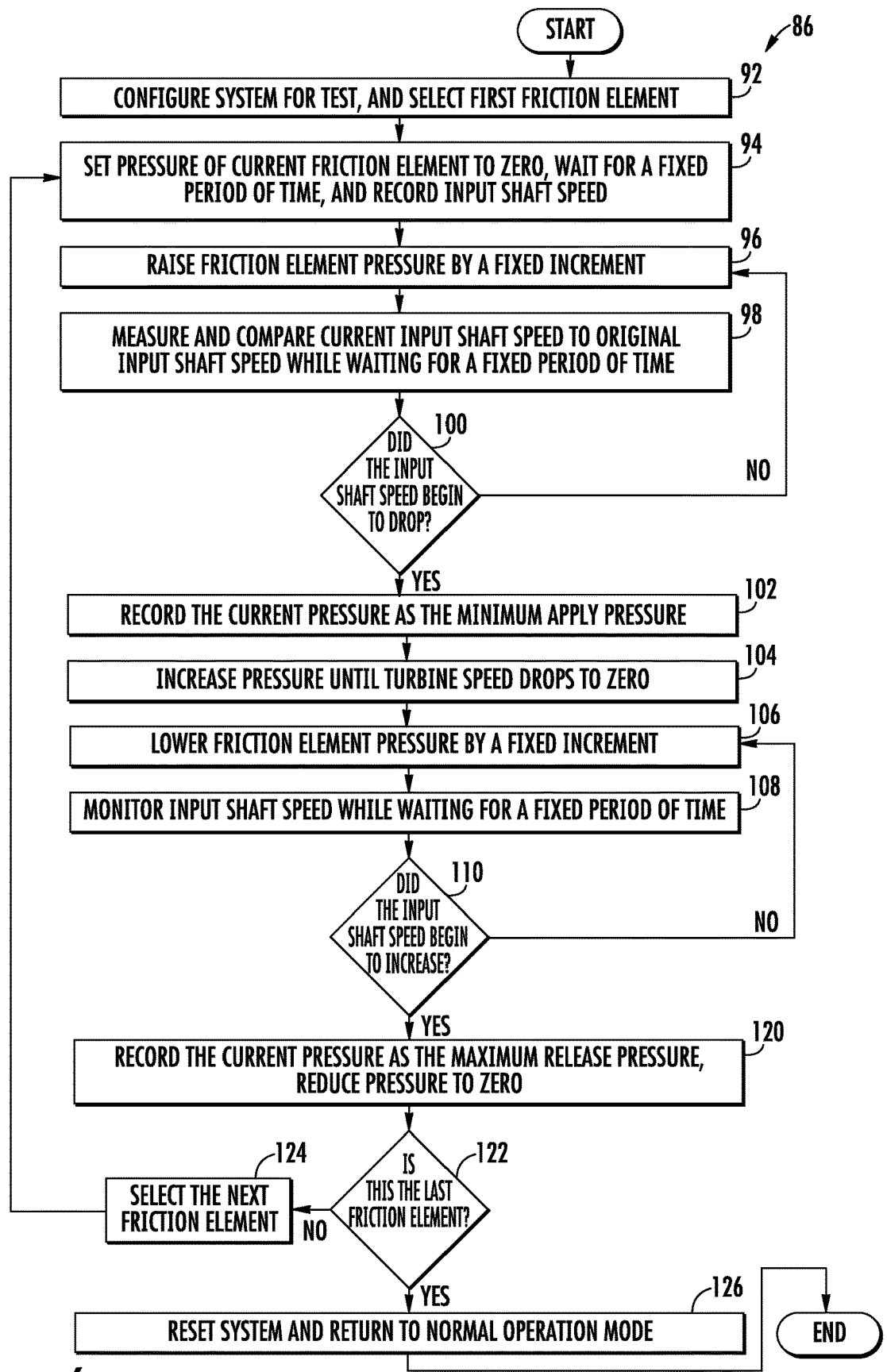
FIG. 6 is a flowchart showing a static pressure step procedure according to certain aspects of the present disclosure.

FIG. 5 is a flowchart 80 showing an overview level of steps 82, 84, 86, 88, and 90 of the disclosed system used to tune a transmission according to various aspects of the present disclosure. FIGS. 6-8 respectively flesh out aspects of steps 86-90 of FIG. 5. It should be understood that all such steps are not required in all aspects of the invention. Steps 86, 88 and 90 are detailed further in FIGS. 6-8 below.

As illustrated in FIG. 5, a dataset is collected 82 and stored 84 (at least in one of electronic control module 30 and/or transmission control module device 32) related to a generalized (typical) pressure-current curve for each of the pressure control solenoids used in the subject transmission. Temperature compensation data for the solenoids may also be collected and stored if relevant. This data would typically be provided by the manufacturer of the transmission control system. Each pressure-current curve would typically be created by empirically testing a representative set of solenoids of the type used in the target transmission through a known procedure, discussion of which is not required for this disclosure. This data can be used to linearize solenoid performance by providing a reasonable approximation of solenoid performance, and is not intended to describe the exact performance characteristics of the solenoids contained within a specific transmission.

After the transmission is installed in the target vehicle, an automated static pressure step test 86 (FIG. 5 and FIG. 6) would be performed (e.g., by the installer or end user) under static conditions (i.e., with the engine running, and the vehicle not in motion). The step test may be initiated using a user interface on transmission control module 32 and/or user interface device 32a. The step test includes, for each clutch and clutch control solenoid 44, directing the associated servo to cause the clutch to apply pressure in increments, for example in steps of 10 psi, or perhaps smaller steps of 5 psi, until clutch engagement occurs. Various parameters of the engine and transmission are also measured at this time.

According to the on-going clutch process, (also known as an "on-coming" clutch process and used that way below and in the claims), a first friction element is selected 92, and the servo and clutch are configured so that the pressure on that friction element is zero. After a fixed period of time, the input shaft (40) speed is noted 94. The pressure on the first friction element is then raised 96 by a fixed, predetermined increment (e.g., 5 or 10 psi). After a period of time, the speed of input shaft 40 is measured again and compared 98 to the originally measured value.

If the input shaft 40 speed did drop 100, it is concluded that an engagement occurred and the method continues to step 102 where the current pressure on the friction element is stored in the lookup table as the minimum oncoming (clutch apply) pressure. If the input shaft 40 speed did not drop 100, it is concluded that no engagement occurred and the method returns to the incrementation step 96 and the measure and compare step 98 until the speed drop is noted and the method then moves to step 102. In incrementation step 96, the increment is bumped up (e.g., to 10 or 20 psi, or a given percentage, depending on the increment size), until the engagement occurs.

If desired, the increments above may be made first in a larger range, then backed to the most previous value before detection and then incremented in a smaller range. The larger value increments may be in the range of for example about 10%, or a smaller range of for example about 5% or 2%, with the finer step values being a lesser percentage in each case. One useful arrangement may include larger increments of about 5% with smaller (fine-tuning) increments of about 2%. If fine tuning is to be performed, the relevant friction element pressure would be returned to zero and then raised to the increment just before engagement occurred and repeating steps 96, 98, 100, 102 but using the smaller increment, until engagement occurs. If desired, instead of detecting RPM drop at the input shaft 40 during the above process, detection of torque converter slip could be used to identify engagement.

Similarly, a reverse off-coming clutch process 104-120 can then be done for each servo/clutch combination where an engaged clutch pressure is decremented by a value (e.g., 5 or 10 psi) until the clutch disengages and a minimum hold pressure is determined. Again, a fine tuning using smaller decrements can be employed here as well.

In particular, the friction element pressure is increased 104 until the input shaft 40 speed drops to zero. The friction element pressure is decremented 106, and the speed of shaft 40 monitored 108/110. If the speed of shaft 40 did not change from zero, the pressure is decremeneted 106 again and speed is monitored 108/110 until the speed of shaft 40 eventually increases. The value of pressure that caused that increase is then recorded in the look up tables as the maximum release pressure 120. Then, the controller determines whether it has tested all such friction elements 122. In not, then the next element is chosen 124, and the method returns to step 94 for that element. When the final element has been tested and results stored in a memory in transmission control module 32 or electronic control module 30, the process is complete and the system is returned 126 to normal operation by transmission control module 32. Depending on the mechanical architecture of the transmission, especially whether it incorporates one-way clutches for lower gear ratios, it may be necessary to isolate all friction elements during the static pressure step test, such test should be conducted with the transmission both in forward and in reverse.

Data measured during static pressure step test 86 characterizes the whole transmission as an assembly, and thus includes parameters such as minimum clutch apply pressure, minimum clutch holding pressure, clutch engagement and release response times. All of this information, including the values recorded in steps 102 and 120, is stored in a set of lookup tables in electronic control module 30 and/or transmission control module 32. The static response time data learned during step test 86 and subsequent data collecting dynamic operation is then used to fine tune and synchronize the timing of the on-coming and off-going clutch events, as well as the release of the torque converter clutch during shifts.

It is possible as an alternative that a transmission or transmission control system manufacturer could itself provide the information gleaned above in the static learn process. This could be done, for example, if a population of transmissions proves to be relatively consistent from unit to unit. In such a case, static learn could be performed during development on a representative transmission, and this step would not be implemented herein. In such a case, the fixed values could be used as a basis for dynamic learning described below to correct any discrepancies in the representative static learn data. The control module 32 and/or user interface device 32a could present a user with the option to choose fixed (manufacturer) value or static learned (as per the above) values. Thus, in an alternate implementation, the static pressure step test could be performed on a representative transmission during development testing, and the resultant data would be loaded into the controller 32 during manufacture or by the customer during setup.

A learning and self-adjustment step 88/128-140 (FIGS. 5 and 7) is then completed by operating the vehicle while the electronic control module 30, transmission controller 32, and/or the user interface device 32a adjusts transmission control parameters during such operation until a desired performance is achieved. In the process, a further set of look-up tables is updated and stored expressing additional parameters, such as on-coming clutch pressure versus load, engine torque, and/or throttle angle. The initial data in the look-up tables could be that provided by an OEM transmission manufacturer or by an aftermarket hardware or software provider, and in either case could be modified by a technician.

The data in the look-up tables are used as a basis to further adjust the value of the clutch apply pressure for each shift (i.e., from gear 1 to 2, from gear 2 to 3, etc.), at each load point in the shift. As the vehicle is driven 128, transmission control module 32 monitor(s) 130 to determine when a shift is in progress. If so, the shift is performed and parameters are monitored 132. If performance data is not within desired limits 134, then based on the look-up table value, the module 32 will adjust the pressure 138 by setting an initial additional incremental pressure above or below the minimum clutch apply pressure (from step 86) used to initiate the engagement of the on-coming friction element and the method returns to step 128.

The adjustment may if desired be by an increment that is a smaller increment than the adjustment above, whether a single or fine-tuned adjustment. For example, the increment could be an amount equal to 2%, 1%, 0.5%, etc., as desired, in view of static pressure step test increments. The vehicle is further driven and that particular shift and load point is again noted 130, 132, 134 until the shift is determined to have occurred within performance data specifications. If so, the adjusted clutch pressure is noted and stored in the lookup table and learning for this shift and load point is deemed completed 136. Transmission control module 32 then determines 140 whether all available shifts for transmission 26 have been tested at each load point and determined to be within specification in step 134. If not, the method returns to step 128 and the vehicle is driven further following the steps 128-140 again until learning is complete for all shifts and look-up tables are updated and stored accordingly.

The performance data specifications evaluated could be multiple measured aspects. For example, if the "Ratio Slip RPM Acceleration" values observed during the shift exceed the ratio slip RPM ramp rate values (as pre-set, or as adjusted by the user in step 90) by a predetermined percentage, then the on-coming clutch pressure value for that shift and load point will be decreased by a fixed amount. Similarly, if flare is detected during the period of time when the off-going clutch should still be carrying the torque of the engine, then the off-going clutch hold pressure will be incremented upward by a fixed amount. Other elements could be evaluated for undesirable or out of specification conditions. If any of such discrepancies are observed during shifts during operation, then successive adjustments will continue to be made until satisfactory results are achieved for all shifts.

Thus, following the above guidelines, in step 88/128-140, a pressure value for each friction element is further adjusted from the values determined in step 86/92-126, incrementally by the firmware in transmission control module 32 in a one-time, learning process, at each load point for each shift.

In step 90 (FIGS. 5 and 8) the end user may adjust shift "feel" by altering the value of the ratio slip RPM ramp rate (ramp rate versus load graph). The general slope of these curves will provide compensation for the engine's increasing torque as load or throttle angle is increased. Further adjustments to the shape of these curves provides customization of shift feel versus load, allowing users to achieve the exact shift characteristics that they desire under all operating conditions. By providing initial tuning curves based on the modified lookup tables before the fourth step, the end user has a good starting point for tuning with various engine and vehicle combinations, so that tuning effort is minimized.

As shown in FIG. 8, the user drives the vehicle 142 and notes the shift feel for each shift. In particular, if a shift feel is too soft 144, the user will raise 146 the engagement ramp tuning graph at that load point for that shift. If the shift feel is too harsh 148, the user will lower 150 the engagement ramp tuning graph at that load point for that shift. As a practical matter, steps 144 and 148 are essentially the same evaluation step with result of too soft 146, too harsh 150 or satisfactory 152. The shift feel changes can be input by the user using the transmission control module 32/interface device 32a and further driving can be performed. If deemed safe under the testing circumstances, this can be done while driving; if not, then the changes can be made while the vehicle is stopped, and then driving can commence again. The transmission control module 32, or the user, can track 154 whether all shifts at all load points have been evaluated and are deemed satisfactory. If not, the process returns to step 142 for more driving; if so, the process is complete.

FIG. 9 is a flowchart 156 outlining a shift controlled by electronic control module 30/transmission control module 32, and also outlined in FIG. 4, and utilizing the adjusted parameters derived according to aspects of the disclosure above. As shown, when starting 158 shift from gear 2 to 3 (1 on FIG. 4), the off-going clutch is set to an initial hold pressure level 160 (2 on FIG. 4), the on-going clutch (i.e., "on-coming") is set to a high pressure level 162 and the system waits until the clutch fills (3 in FIG. 4). The on-going clutch is set to a lower starting value 164 based on the static/dynamic value arrived at in steps 86 and 88 (the methods of FIGS. 6 and 7) (4 in FIG. 4). The off-going clutch is then set to a lower starting value 166 based on the static/dynamic value arrived at in steps 86 and 88 (the methods of FIGS. 6 and 7) (5 in FIG. 4). After an additional wait 168 (6 in FIG. 4) based on expected response time from on-going clutch, the on-going clutch pressure is ramped up 170 (7 in FIG. 4) based on user-adjusted shift firmness arrived at in step 90 (the method of FIG. 8) for this shift. Once the inertial phase begins and RPM's begin to drop 172 (8 in FIG. 4), the off-going clutch pressure is reduced to zero 174 (9 in FIG. 4). Then, after a specific delay (10 in FIG. 4), the pressure of the on-coming clutch can be modulated (based on closed-loop feedback) to provide a smooth engagement, using the ramp rate from step 90 (FIG. 8) as a target, until the shift reaches the static phase 176 (11 in FIG. 4). Once the transmission ratio speed error reaches zero (or timeout occurs), the pressure of the oncoming clutch is raised to maximum 178 (11 in FIG. 4). Afterwards 180, the shift is compete (12 in FIG. 4).

In summary, this process above involves up to four steps of adjustment to achieve accurate pressure control with minimal effort. The first step, generalized solenoid characterization, is performed during development testing by the manufacturer, while second step, the static pressure step test, is typically initiated by the customer or installer but could also be performed during development testing by the manufacturer. The third step of automatically adjusting the additional on-coming clutch pressure-versus-load curves constitutes fine tuning of the apply pressure to achieve the best shift quality possible. The manufacturer will supply pre-adjusted pressure curves that are intended to provide a good starting point for the automatic adjustment. The final step of pressure ramp rate adjustment occurs after learning is completed, allowing further adjustments to be made by the end user to accommodate the exact characteristics of the target vehicle, as well as personal shift quality preferences.

As a safety measure, the transmission will be held in fail-safe (default operation) mode until a valid tuning calibration is loaded into the controller with a complete set of default pressure-versus-load curves, and the static pressure step test is completed. Additional criteria may also be necessary to release the transmission from fail-safe mode. Certain detected failure modes will also cause the transmission to re-enter fail-safe mode. The transmission must be released from fail-safe mode to drive mode for dynamic learning to commence.

During a shift as outlined in FIGS. 3, 4 and 9, the minimum engagement pressures learned from the static step test calibration will be used as a baseline for the on-coming clutch pressure, with the automated dynamic tuning curve adjustments added to the appropriate static value. Other compensation factors may also be included in the pressure calculation, as well. Once the target pressure is determined, it will be converted to units of electrical current for the appropriate solenoid, and the solenoid will be actuated via PWM duty cycle control or other means, while employing temperature compensation and/or closed-loop current control to provide consistent operation with respect to temperature.

A similar method is used to calculate the starting pressure of the off-going clutch, with the objective of reducing the pressure to a hold value that can briefly carry the current level of transmitted torque with minimal, but negligible, slip. The off-going clutch pressure value can be low enough that the off-going clutch will eventually begin to slip, as the clutch piston or band servo force approaches the new, lower value, and the surface tension of the oil on the friction materials is eventually overcome. If the on-coming clutch does not engage soon after the expected time, the off-going clutch will begin to slip, resulting in a modest RPM rise or flare during the shift, but this will only occur when the on-coming or off-going clutch pressure is too low. The dynamic adaptive adjustment capability should correct this issue after several shifts have been completed. Since the relatively low off-going clutch pressure makes it incapable of carrying much additional torque, it is difficult for the transmission to tie-up due to improper tuning or adjustment. As a result, this tuning and operation methodology is relatively safe. The off-going clutch pressure is a function of its learned static holding pressure and the automatically adjusted tuning curves. Off-going clutch pressure will either remain constant, or will be ramped down throughout the torque phase of the shift.

On-coming clutch (or band) pressure will also be modulated during the shift event in various ways. A brief, initial pulse of higher commanded pressure may be employed at the onset of the shift event, as a way to accelerate the response of the solenoid and the hydraulic system during the fill phase of the shift. After this optional, initial pulse is executed (or at the onset of the shift event, if a starting pulse is not utilized), the starting pressure for the on-coming friction element will be calculated, as described above. At this point, on-coming clutch or band pressure will be ramped according to a fixed or adjustable ramp rate, until the shift progresses from the torque phase, into the inertial phase.

Once the inertial phase of the shift has begun, if the pressure on the off-going clutch is not already at zero, the off-going clutch pressure will immediately be dropped to its minimum value (essentially zero). This quick release of the off-going clutch at this point also provides another degree of protection from transmission tie-up, because a tie-up condition may also trigger the inertial phase detection mechanism. The ramp rate of the on-coming clutch may be altered based upon several factors, including the user-adjustable ramp rate curves, to maximize shift quality (e.g. to achieve an ideal rate-of-change for transmission speed ratio error, or slip, during the shift). The on-coming clutch pressure ramp rate during the inertial phase may be slower or faster than that employed during the torque phase.

Closed-loop factors, such as current transmission speed ratio error (proportional term), its rate-of-change (derivative term), second derivative term, or a composite of these and other factors may also be used to provide real-time feedback to improve shift quality and to mitigate the effects of tuning errors. These additional adjustments, whether via real-time feedback, or via adaptive data accumulated from actual operation over time, represent an optional fifth element of the calibration system, and one that does not require input from the vehicle operator or tuner.

The shift ends when the static phase is complete. Once the static phase is detected, the commanded pressure to the on-coming clutch is set to its maximum value, and the pressure of the off-going clutch is set to its minimum value, if this has not already been done, and the shift is completed.

FIG. 10 depicts an overall organization menu for the transmission control module 32, while FIGS. 11 and 12 respectively show tuning and setup sub-menus. If a user interface 32a is employed with a more detailed screen and more input button options, similar parameters and adjustments may be presented therein, with a modified arrangement of elements if desired. It should be understood that the items listed and their organization are not limiting but are simply examples. Also, methods of moving between items or selecting or incrementing items need not be those shown (knob rotation, single click, double click, timed transition, etc.), in particular if device 32a is used. Such items are useful with transmission control module 32 having rotatable and clickable knob 37. However, any sort of physical keyboard, keypad, button, knob, slider, etc., and touch screen versions, equivalents or alternatives, whether on transmission control module 32, user interface device 32a and/or an alternate external device as noted above would also all be encompassed.

More particularly, FIG. 10 shows items in display 35 of transmission control module 32 when activated and manipulated. Initially, (at 0) when device is turned on display is at "status," then after timed delay actual transmission status (0B) is shown. For status, display 35 shows left-to right an indicator of selected transmission range (P, R, N, O, D, 2 or 1), shift mode (auto, manual or pushbutton), and the currently commanded gear. By double clicking in status mode, the shift mode can be switched between auto or manual.

Rotating the knob from status (0, 0A, or most likely 0B after timed delay), display 35 can be moved through the following modes, with a value shown after a timed delay: vehicle speed in MPH 1, 1A; throttle position sensor value in volts 2, 2A; transmission fluid temperature in desired degrees 3, 3A; tachometer reading in RPM 4, 4A; battery condition in DC volts 5, 5A; commanded transmission line pressure in PSI 6, 6A; desired control table selection from available tables 7, 7A; go to setup menu 8; go to tuning menu 9; software version 10, 10A; and clear learned data 11, 11A, 11B. It should be understood that any parameter capable of being sensed can be displayed by display 35.

Also, display 35 can provide other information during manipulation or operation, such as error codes, warnings, all-clear signals, etc.

FIG. 11 shows one possible arrangement of a tuning sub-menu enterable via step 9 of FIG. 10 wherein various settings can be changed. Rotating knob 37 moves through the entries of the tuning sub-menu while clicking at any point allows selection of the currently shown entry, after which further rotation changes the value. The following adjustments can be made: idle throttle position senor voltage threshold 1, 1A; wide-open throttle position sensor voltage threshold 2, 2A; 1-2 up shift full-throttle shift RPM 3, 3A; 2-3 upshift full-throttle shift RPM 4, 4A; 3-4 upshift full-throttle shift RPM 5, 5A; all-shift light throttle shift RPM 6, 6A; transmission input shaft RPM at which torque converter clutch engages 7, 7A; light throttle shift firmness in input shaft RPM change per 10 milliseconds 8, 8A; heavy throttle shift firmness in input shaft RPM change per 10 milliseconds 9, 9A; speedometer output mode 10, 10A; save changes and exit to main menu 11; and discard changes and exit to main menu 12. Again, numerous adjustments and indications can be provided in this sub-menu beyond those noted above as examples.

FIG. 12 shows a setup sub-menu for carrying out several of the adjustment operations in methods of FIGS. 5-9. For example, a throttle position sensor calibration procedure can be done 1, 1A by stroking the accelerator pedal and waiting for a confirmation. The static learning procedure of FIG. 6 is entered at 2, with pass/fail indications at 2A. This step is typically done once in forward and once in reverse (although reverse static learning may not be required), and is triggered by pressing knob 37 with the transmission in each position. Clear data can be done at 3, whether clearing no data, shift timing only, static learn data (FIG. 6), dynamic learn data (FIG. 7) or all. Speedometer output mode can be adjusted in 4, 4A as above. Finally, a return to main menu is possible at 5.

It should be understood that the methods and elements above could also be readily applied to adjusting on-coming clutch pressure for a torque converter, whether in a C2C transmission or otherwise. Thus, a static adjustment mode and/or a dynamic learning procedure could be used to control the torque converter just as for the transmission as described above.

Transmission control module 32 can include fail-safe modes related to adjustments above. For example, the transmission can be kept in a fail-safe mode until a valid configuration is loaded, and/or at least until static learning is completed, and an alternate fail-safe mode can be entered in case of any detected software or hardware malfunction, or any sensor reading or combination of readings being out of predetermined safe range(s). Failures that can invoke fail-safe mode operation include, but are not limited to: inconsistent firmware execution or watchdog timer failure, detection of a shorted solenoid driver circuit, detection of an open solenoid circuit, unexpected response of the transmission to a solenoid command, tie-up of the transmission, incorrectly programmed default parameters, firmware check-sum error, tuning calibration check-sum error, or critical sensor errors.

If desired, the transmission control module 32 firmware can self-monitor for shift progress, shift flare, and tie-up so as to use in system control and safety monitoring. The firmware may also have a diagnostic functionality to detect hardware failures in the controller, transmission solenoids, sensors, and connecting wiring. Diagnostic tests may be run at system start-up and continuously during system operation.

Control parameters of particular interest for more desirable shifting may include use of a short duration high pressure pulse for the on-coming clutch at the beginning of a shift (see point 3 in FIG. 4). Also, the disclosed methods and elements allow regulation of pressure in real time, during a shift, thereby providing desirable shift characteristics. If desired, the transmission may be set so as to start in an automatic mode in a gear higher than 1st gear. The transmission may also be set so as to allow the transmission to be locked in two gears at once when the vehicle is stopped. This will effectively prevent the vehicle from moving, even when full engine power is applied. This locking action could be invoked in any gear that could be used as a starting gear, and would include safety interlocks to prevent application when the vehicle is already moving.

Thus, the disclosed subject matter provides an easy to use and user-friendly system and method to safely and effectively tune and configure clutch-to-clutch automatic transmissions with current-controlled clutch pressure control solenoids that employ mainly synchronous shifts. This disclosure is applicable to many different clutch-to-clutch transmissions, both for use in the context of the automotive performance and racing aftermarket as well as in other contexts. Therefore, the disclosed concepts are not intended to be constrained to the application of any particular transmission.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A transmission control device for a vehicle having a powertrain including an engine, a transmission with a plurality of solenoid actuated friction elements, and sensors, the device comprising:
at least one connection for transmitting signals to and from the engine, the transmission, and the sensors within the vehicle; and
a memory for storing a program for adjusting and controlling the transmission and data including friction element apply pressure data, the program storing a minimum on-coming apply pressure for each of the friction elements in the memory as initial optimized values, the program directing the powertrain to perform a dynamic condition procedure while the vehicle is being driven to determine a modified minimum on-coming apply pressure for each of the friction elements based on a sensed performance of an element within the powertrain, the program storing the modified minimum on-coming apply pressures in the memory as further optimized values, after completion of the dynamic condition procedure, the program controlling the transmission during operation of the vehicle using the further optimized values.

2. The device of claim 1, wherein the sensed performance is a ratio slip RPM ramp rate.

3. The device of claim 1, further including a housing in which the memory is mounted and to which the at least one connection is connected.

4. The device of claim 3, further including a user input device separate from and in communication with the housing, the user input device having a display and at least one input element.

5. The device of claim 1, wherein the data includes a plurality of lookup tables with transmission control data stored in the memory.

6. The device of claim 1, wherein the program directs the transmission to operate with a short-duration, high-pressure pulse to each friction element at the beginning of a shift.

7. The device of claim 1, wherein the program directs the powertrain to perform a static condition procedure while the vehicle is stationary by incrementally increasing the on-coming apply pressure for each of the friction elements sequentially until a minimum on-coming apply pressure is determined for each of the friction elements based on a sensed friction element performance, the program storing the determined minimum on-coming apply pressures in the memory as the initial optimized values, wherein the static condition procedure is performed incrementally with increments, wherein each successive increment is no more than about 10% higher than at a respective preceding increment.

8. The device of claim 7, wherein each successive increment is no more than about 5% higher than at a respective preceding increment.

9. The device of claim 7, wherein during the static condition procedure, after the initial optimized values are determined using a first increment, the program again directs the powertrain to perform the static condition procedure incrementally using a second increment smaller than the first increment to determine the minimum on-coming apply pressures to be stored in the memory as the initial optimized values.

10. The device of claim 9, wherein the first increment is about 5% higher than at a respective preceding first increment and the second increment is about 2% higher than at a respective preceding second increment.

11. The device of claim 7, wherein the static condition procedure further includes adjusting a maximum off-going apply pressure for each of the friction elements sequentially until a maximum off-going apply pressure is determined for each of the friction elements based on a sensed slippage for each of the friction elements, and storing the determined maximum off-going apply pressures in the memory as initial optimized off-going values.

12. The device of claim 1, wherein the dynamic condition procedure is performed incrementally with each successive increment of minimum on-coming apply pressure being no more than about 2% higher than at a respective preceding increment.

13. The device of claim 1, wherein the dynamic condition procedure further includes determining a modified maximum off-going apply pressure for each of the friction elements based on a sensed slippage for each of the friction elements, storing the determined modified maximum off-going apply pressures in the memory as further optimized off-going values, the program controlling the transmission during operation of the vehicle using the further optimized off-going values.

14. The device of claim 1, wherein the program dictates a fail-safe mode of parameters for disabling operation of the transmission in case of at least one of out of parameter adjustment and detection of a critical fault.

15. A method of adjusting and using operating parameters of a transmission of a vehicle, the transmission having a plurality of friction elements, the method comprising:
  accessing a stored list of clutch parameters including; a minimum on-coming apply pressure for each of the friction elements as initial optimized values in a list of clutch parameters;
  performing a dynamic condition procedure while the vehicle is driven to revise the clutch parameters, the dynamic condition procedure including determining a modified minimum on-coming apply pressure for each of the friction elements based on a sensed performance of an element within the powertrain;
  storing the modified minimum on-coming apply pressure as further optimized values in a revised list of clutch parameters; and
  operating the vehicle using the revised list of clutch parameters.

16. The method of claim 15, wherein the additionally adjusting step adjusts a ratio slip RPM ramp rate.

17. The method of claim 15, further including performing a static condition procedure while the vehicle is stationary to revise the clutch parameters before performing the dynamic condition procedure, the static condition procedure including incrementally increasing the on-coming apply pressure for each of the friction elements in the transmission until the minimum on-coming apply pressure is obtained for each of the friction elements and storing the determined minimum on-coming apply pressures as the initial optimized values, wherein the static condition procedure is performed incrementally with each successive increment of minimum on-coming apply pressure being no more than about 10% higher than at a respective preceding increment.

18. The method of claim 17, wherein each successive increment is no more than about 5% higher than at a respective preceding increment.

19. The method of claim 17, wherein during the static condition procedure, after the initial optimized values are determined using a first increment, a second static condition procedure is performed incrementally using a second increment smaller than the first increment to determine the minimum on-coming apply pressures to be stored in the memory as the initial optimized values.

20. The method of claim 19, wherein the first increment is about 5% higher than at a respective preceding first increment and the second increment is about 2% higher than at a respective preceding second increment.

21. The method of claim 17, wherein the static condition procedure further includes adjusting a maximum off-going apply pressure for each of the friction elements sequentially until a maximum off-going apply pressure is determined for each of the friction elements based on a sensed slippage for each of the friction elements, the method further including storing the determined maximum off-going apply pressures as initial optimized off-going values in the revised list of clutch parameters.

22. The method of claim 15, wherein the dynamic condition procedure is performed incrementally with each successive increment of minimum on-coming apply pressure being no more than about 2% higher than at a respective preceding increment.

23. The method of claim 15, wherein the dynamic condition procedure further includes determining a modified maximum off-going apply pressure for each of the friction elements based on a sensed slippage for each of the friction elements, the method further including storing the determined modified maximum off-going apply pressures as further optimized off-going values in the further revised list of clutch parameters.

24. The method of claim 15, further including dictating a fail-safe mode of parameters for disabling operation of the transmission in case of at least one of out of parameter adjustment and detection of a critical fault.

25. The method of claim 15, further including adjusting in a real-time, closed-loop manner a pressure ramp rate during the execution of a shift.

26. The method of claim 15, further including controlling the transmission so as to selectively start in a gear other than a lowest forward gear.

27. The method of claim 15, further including adjusting the transmission so as to lock the transmission while the vehicle is stopped by applying a plurality of the friction elements.

28. The method of claim 15, wherein the clutch parameters include a maximum off-going apply pressure for each of the friction elements.

29. The method of claim 15, the method also including additionally adjusting the clutch parameters after the dynamic condition procedure based on shift feel.

* * * * *